(12) United States Patent
Hagiwara

(10) Patent No.: US 10,189,124 B2
(45) Date of Patent: Jan. 29, 2019

(54) ASSEMBLING DEVICE OF WHEEL HUB UNIT

(71) Applicant: NSK LTD., Shinagawa-ku, Tokyo (JP)

(72) Inventor: Nobuyuki Hagiwara, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/116,904

(22) PCT Filed: Feb. 3, 2015

(86) PCT No.: PCT/JP2015/000473
§ 371 (c)(1),
(2) Date: Aug. 5, 2016

(87) PCT Pub. No.: WO2015/122149
PCT Pub. Date: Aug. 20, 2015

(65) Prior Publication Data
US 2017/0165798 A1 Jun. 15, 2017

(30) Foreign Application Priority Data

Feb. 13, 2014 (JP) .................................. 2014-025509

(51) Int. Cl.
*B23P 19/02* (2006.01)
*F16C 35/063* (2006.01)
(Continued)

(52) U.S. Cl.
CPC ............... *B23P 19/02* (2013.01); *B23P 11/00* (2013.01); *B23P 11/005* (2013.01);
(Continued)

(58) Field of Classification Search
CPC .............. B60B 27/0005; B60B 27/001; B60B 27/0078; B60B 35/18; F16C 19/38; F16C 35/063
See application file for complete search history.

(56) References Cited

U.S. PATENT DOCUMENTS 1,369,210 A * 2/1921 Zimmerman ........... B60B 35/18
384/583
1,631,557 A * 6/1927 Sponable .............. B60B 27/001
384/583
(Continued)

FOREIGN PATENT DOCUMENTS

EP 1 607 646 A1 12/2005
JP 58-093426 U1 6/1983
(Continued)

OTHER PUBLICATIONS

Extended European Search Report issued in counterpart European Application No. 15749595.3 dated Feb. 1, 2017 (9 pages).
(Continued)

*Primary Examiner* — Tyrone V Hall, Jr.
(74) *Attorney, Agent, or Firm* — Crowell & Moring LLP

(57) ABSTRACT

An assembling device including: a bearing setting unit configured to set a bearing unit such that the bearing unit is coaxial with respect to a hub cylindrical part and can be moved toward the hub cylindrical part, a rotational drive source configured to transmit rotational force around an axis to the bearing unit set in the bearing setting unit; and an inner-ring press-fitting unit configured to externally fit inner rings of the bearing unit to which the rotational force around the axis has been transmitted, to the hub cylindrical part.

3 Claims, 18 Drawing Sheets

(51) Int. Cl.
  *B60B 27/00* (2006.01)
  *F16C 19/38* (2006.01)
  *B23P 11/00* (2006.01)

(52) U.S. Cl.
  CPC ........ *B60B 27/001* (2013.01); *B60B 27/0084* (2013.01); *F16C 19/386* (2013.01); *F16C 35/063* (2013.01); *B60B 2320/10* (2013.01); *F16C 2226/12* (2013.01); *F16C 2326/02* (2013.01)

(56) References Cited

U.S. PATENT DOCUMENTS

| | | | | |
|---|---|---|---|---|
| 1,889,063 | A * | 11/1932 | Dunham | F16C 35/063 384/538 |
| 1,944,380 | A * | 1/1934 | Vance | B21D 39/06 29/33 R |
| 2,906,558 | A * | 9/1959 | Forbush | B60B 3/18 301/105.1 |
| 4,203,635 | A * | 5/1980 | Reiter | B60B 27/001 384/560 |
| 5,596,798 | A * | 1/1997 | Hofmann | B21K 25/00 29/724 |
| 2001/0020329 | A1 * | 9/2001 | Webb | B23P 11/005 29/898.07 |
| 2005/0126005 | A1 * | 6/2005 | Yasumura | B21J 9/025 29/898.061 |
| 2006/0137186 | A1 * | 6/2006 | Seo | F16C 19/386 29/898.062 |

FOREIGN PATENT DOCUMENTS

| | | |
|---|---|---|
| JP | 63-74227 U | 5/1988 |
| JP | 4-336930 A | 11/1992 |
| JP | 2000-343905 A | 12/2000 |
| JP | 2002-283805 A | 10/2002 |
| JP | 2003-21153 A | 1/2003 |
| JP | 2011-185395 A | 9/2011 |
| WO | WO 2004/001247 A1 | 12/2003 |

OTHER PUBLICATIONS

Chinese-language Office Action issued in counterpart Chinese Application No. 201580007980.0 dated Jun. 28, 2017 with partial English translation (Eight (8) pages).

International Preliminary Report on Patentability (PCT/IB/338 & PCT/IB/373) including English translation of Written Opinion (PCT/ISA/237) issued in PCT Application No. PCT/JP2015/000473 dated Aug. 25, 2016 (eight pages).

International Search Report (PCT/ISA/210) issued in PCT Application No. PCT/JP2015/000473 dated May 12, 2015, with English translation (four (4) pages).

Japanese-language Office Action issued in counterpart Japanese Application No. 2014-025509 dated Nov. 7, 2017 with unverified English translation (eight pages).

Japanese-language Office Action issued in counterpart Japanese Application No. 2014-025509 dated May 1, 2018 with English translation (six (6) pages).

Japanese-language Office Action issued in counterpart Japanese Application No. 2018-209695 dated Dec. 11, 2018 with English translation (nine (9) pages).

* cited by examiner

ASSEMBLING DEVICE OF WHEEL HUB UNIT

TECHNICAL FIELD

The present invention relates to an assembling device of a wheel hub unit that rotatably supports a wheel of a vehicle or the like on a suspension device.

BACKGROUND ART

FIG. 19 illustrates a wheel hub unit that rotatably supports a wheel of a vehicle or the like on a suspension device.

The wheel hub unit includes a hub main body 1 and a tapered roller bearing unit BU incorporated in the hub main body 1.

In the hub main body 1, a spline 1b with which an end part of a drive shaft (not illustrated) is spline-engaged is formed on an inner peripheral surface of a hollow cylindrical part 1a, a flange 1c for supporting a wheel (not illustrated) is formed on the underside of the hollow cylindrical part 1a having a straight shape (a shape having the same outer diameter from the upper end to the lower end), a plurality of penetration screw holes 1d are formed in the flange 1c, and an external cylindrical part 1e is formed below the flange 1c.

Inner rings 2, 3 are externally fit to the hollow cylindrical part 1a of the hub main body 1 with the inner rings 2, 3 spaced apart from each other in the axial direction, a distance piece 4 is externally fit to the hollow cylindrical part 1a at a position between the inner rings 2, 3, an outer ring 5 is arranged on the outside of the inner rings 2, 3, and a plurality of tapered rollers 6a, 6b are rollably arranged between the outer peripheral surfaces of the inner rings 2, 3 and the inner peripheral surface of the outer ring 5.

Regarding the inner ring 2, an inner ring raceway 2a on which the plurality of tapered rollers 6a roll is formed on the outer peripheral surface thereof, and a stepped part 2b with which the end surfaces of the tapered rollers 6a in the axial direction are in contact is formed on the outer end part of the inner ring 2 in the axial direction. In addition, regarding the inner ring 3, an inner ring raceway 3a on which the plurality of tapered rollers 6b roll is formed on the outer peripheral surface thereof, and a stepped part 3b with which the end surfaces of the tapered rollers 6b in the axial direction are in contact is formed on the outer end part of the inner ring 3 in the axial direction.

Regarding the outer ring 5, a supporting/fixing part 5c supported and fixed by a suspension device (not illustrated) is provided to protrude toward the outer peripheral side, and an outer ring raceway 5a on which the plurality of tapered rollers 6a roll, which is opposed to the inner ring raceway 2a, and an outer ring raceway 5b on which the plurality of tapered rollers 6b roll, which is opposed to the inner ring raceway 3a, are formed on the inner peripheral surface thereof.

Accordingly, the tapered roller bearing unit BU is configured by a first-row tapered roller bearing 8 including the inner ring raceway 2a of the inner ring 2, the outer ring raceway 5a of the outer ring 5, and the plurality of tapered rollers 6a, and a second-row tapered roller bearing 9 including the inner ring raceway 3a of the inner ring 3, the outer ring raceway 5b of the outer ring 5, and the plurality of tapered rollers 6a.

When a swaged part 7 is formed by plastic-deforming the upper end part of the hollow cylindrical part 1a of the hub main body 1 outwardly in the radial direction, the inner rings 2, 3 of the tapered roller bearing unit BU, which are externally fit to the hollow cylindrical part 1a, are pressed toward the side of the flange 1c, and the first-row and second-row tapered roller bearings 8, 9 are assembled into the hollow cylindrical part 1a of the hub main body 1.

FIG. 20A illustrates a state where the tapered roller 6b of the second-row tapered roller bearing 9 is arranged with the end surface thereof in the axial direction not being in contact with the stepped part 3b, and FIG. 20B illustrates a state where the tapered roller 6b is arranged with the end surface thereof in the axial direction being in contact with the stepped part 3b (hereinafter, referred to as "arranged at a true position").

If the tapered roller 6b of the second-row tapered roller bearing 9 is assembled to be arranged in a state where the end surface in the axial direction is not in contact with the stepped part 3b, as illustrated in FIG. 20A, preload applied to the second-row tapered roller bearing 9 is decreased and the preload is released when forming the swaged part 7, and movement in the axial direction and skew occur in the tapered roller 6b when forming the swaged part 7.

Therefore, in the tapered roller bearing unit BU incorporated in the conventional hub main body 1, a flaw may occur on the inner ring raceway 3a of the inner ring 3 and the outer ring raceway 5b of the outer ring 5. In addition, similarly, in the first-row tapered roller bearing 8, if the tapered roller 6a is arranged at the position illustrated in FIG. 20A, the above-described problem may occur.

In this regard, PTL 1 already filed by the present applicant states that, when an inner ring of a tapered roller bearing unit is externally fit to a cylindrical part of a hub main body (described as a step in PTL 1), an outer ring is rotated (paragraphs 0019 and 0020 in PTL 1).

As stated in PTL 1, aligning action is implemented on tapered rollers by rotating the outer ring when the inner ring is externally fit to the cylindrical part of the hub main body, the tapered roller bearing unit in which the tapered rollers are arranged at the true position as illustrated in FIG. 20B is incorporated in the hub main body, and therefore, a wheel hub unit that prevents release of preload, movement of the tapered rollers in the axial direction, and skew can be provided.

CITATION LIST

Patent Literature

PTL 1: JP 2000-343905 A

SUMMARY OF INVENTION

Technical Problem

However, PTL 1 does not disclose any specific device configurations when the tapered roller bearing unit is incorporated in the hub main body, and thus, there is a problem in the aspect of the assembling efficiency of the wheel hub unit.

In other words, when the wheel hub unit is incorporated using the technology of PTL 1, a device configuration that makes the tapered roller bearing unit be arranged coaxially with the cylindrical part of the hub main body and be moved toward the cylindrical part, a device configuration that makes the inner ring be externally fit to the cylindrical part while transmitting rotational force only to the outer ring, and the like are necessary. However, in PTL 1 that does not specifically disclose the foregoing device configurations, assembly is performed through many working processes, and thus, there is a problem in the aspect of the assembling efficiency of the wheel hub unit.

The present invention has been made by focusing on an unresolved problem of the above-described conventional example, and an object of the present invention is to provide an assembling device of a wheel hub unit, which can efficiently assemble a wheel hub unit, by including a device configuration that makes a tapered roller bearing unit be arranged coaxially with a cylindrical part of a hub main body and be moved toward the cylindrical part and a device configuration that makes an inner ring be externally fit to the cylindrical part while transmitting rotational force to an outer ring.

Solution to Problem

In order to achieve the object mentioned above, according to an aspect of the present invention, there is provided an assembling device of a wheel hub unit, including: a bearing setting unit configured to set a bearing unit including an inner ring, an outer ring, a plurality of tapered rollers rollably arranged between an inner ring raceway formed on an outer peripheral surface of the inner ring and an outer ring raceway formed on an inner peripheral surface of the outer ring, and a stepped part which is formed on an outer end part of the inner ring in an axial direction and with which end surfaces of the tapered rollers in the axial direction are in contact, such that the bearing unit is coaxial with respect to a hub cylindrical part provided at an end part of a hub main body in the axial direction and can be moved toward the hub cylindrical part; a rotational drive source configured to transmit rotational force around an axis to the bearing unit set in the bearing setting unit; and an inner-ring press-fitting unit configured to externally fit the inner ring of the bearing unit to which the rotational force around the axis has been transmitted, to the hub cylindrical part.

In the assembling device of a wheel hub unit according to the aspect of the present invention, the bearing setting unit may include: a circular holding part configured to hold the outer ring of the bearing unit from an outer periphery; a circular driven member which is arranged coaxially around the hub main body and to which the rotational force is transmitted from the rotational drive source; and a rotational force-transmitting part which is connected between the driven member and the holding part and configured to transmit the rotational force transmitted to the driven member, to the holding part.

In the assembling device of a wheel hub unit according to the aspect of the present invention, the rotational force-transmitting part may include a plurality of rotation-transmitting shafts fixed on the driven member and extending toward the holding part. The holding part may include divided holding members divided into two parts, which are configured to open/close with hinge parts as a turn center and to hold the outer ring of the bearing unit. The hinge parts may be connected to one of the plurality of rotation-transmitting shafts such that the two divided holding members turn in a direction perpendicular to the rotation-transmitting shaft, so that the two divided holding members perform an opening/closing operation with the hinge parts as the turn center.

In the assembling device of a wheel hub unit according to the aspect of the present invention, the rotational force-transmitting part may include a plurality of rotation-transmitting shafts swingably connected to the driven member and extending toward the holding part. The holding part may include a plurality of divided holding members divided into parts having the same number as the rotation-transmitting shafts, which are fixed on the plurality of rotation-transmitting shafts and configured to hold the outer ring of the bearing unit. An axis-swinging member engaged with all of the plurality of rotation-transmitting shafts may perform an opening operation, so that the plurality of rotation-transmitting shafts are inclined outwardly in a radial direction of the driven member and the plurality of divided holding members are spaced apart from one another. The axis-swinging member may perform a closing operation, so that the inclination of the plurality of rotation-transmitting shafts is corrected and the plurality of divided holding members hold the outer ring of the bearing unit.

In the assembling device of a wheel hub unit according to the aspect of the present invention, coil springs which support the holding part such that the holding part can be moved toward the hub cylindrical part may be arranged on outer peripheries of the plurality of rotation-transmitting shafts.

In the assembling device of a wheel hub unit according to the aspect of the present invention, the inner ring of the bearing unit may include two inner rings each having a single-row inner ring raceway on an outer peripheral surface. A cylindrical connecting member may be fit to inner peripheral surfaces of the two inner rings, a concave part configured to house the connecting member may be provided in the inner-ring press-fitting unit, and when press-fitting the bearing unit to the hub cylindrical part, the connecting member may be pushed out by the hub cylindrical part to be housed in the concave part of the inner-ring press-fitting unit.

Advantageous Effects of Invention

According to the assembling device of a wheel hub unit according to the present invention, the bearing setting unit has a function of arranging the bearing unit coaxially with the hub cylindrical part of the hub main body and moving the bearing unit toward the hub cylindrical part, the rotational drive source has a function of transmitting the rotational force to the bearing unit held by the bearing setting unit, and the inner-ring press-fitting unit has a function of externally fitting the inner ring of the bearing unit to the hub cylindrical part, so that a device configuration that makes the inner ring be externally fit to the hub cylindrical part while transmitting the rotational force to the outer ring of the bearing unit is used. Therefore, the bearing unit can be efficiently assembled into the hub cylindrical part of the hub main body in short working time and in small working man-hours.

DESCRIPTION OF EMBODIMENTS

Figure 19:
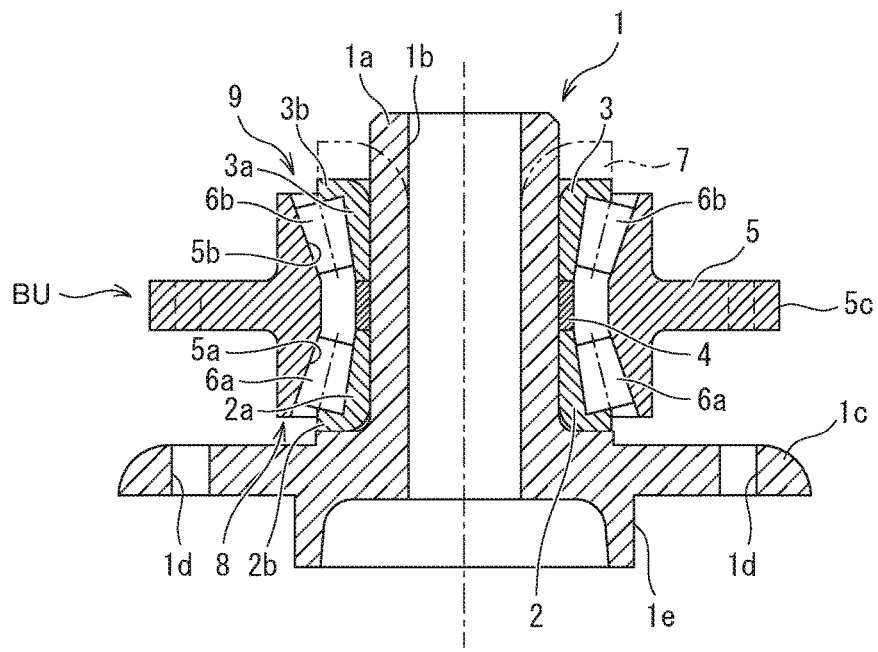
FIG. 19 is a cross-sectional view illustrating a configuration of a wheel hub unit according to the present invention.

Hereinafter, modes for carrying out the present invention (hereinafter, referred to as "embodiments") will be described in detail with reference to drawings. It is to be noted that the same components as those illustrated in FIG. 19 are denoted by the same reference numerals, and the description thereof will be omitted.

[First Embodiment]

FIG. 1 to FIG. 5 illustrate an assembling device of a wheel hub unit of a first embodiment according to the present invention.

Figure 1:
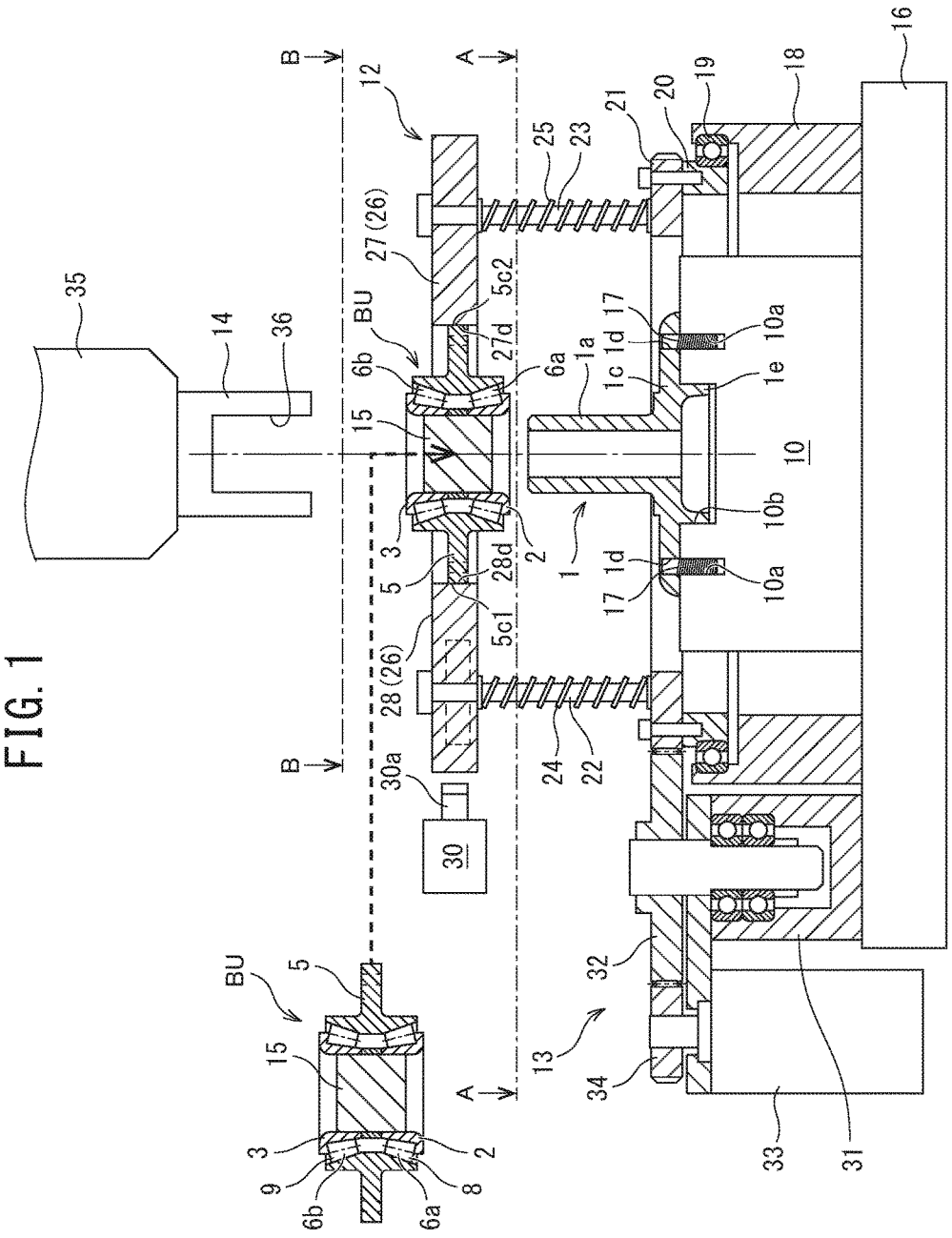
FIG. 1 is an essential part cross-sectional view illustrating an assembling device of a wheel hub unit of a first embodiment according to the present invention.

As illustrated in FIG. 1, the assembling device of a wheel hub unit of the present embodiment includes a hub main body-placing unit 10 on which a hub main body 1 is placed with a hollow cylindrical part 1a extending upward, a bearing setting unit 12 which sets a tapered roller bearing unit BU (hereinafter, abbreviated to a bearing unit BU) in the upper position of the hollow cylindrical part 1a such that the bearing unit BU can be lowered, a rotational drive source 13 which transmits rotational force to an outer ring 5 of the bearing unit BU set in the bearing setting unit 12, and an inner-ring press-fitting unit 14 which lowers the bearing unit BU set in the bearing setting unit 12, so that inner rings 2, 3 are externally fit to the hollow cylindrical part 1a.

Figure 3:
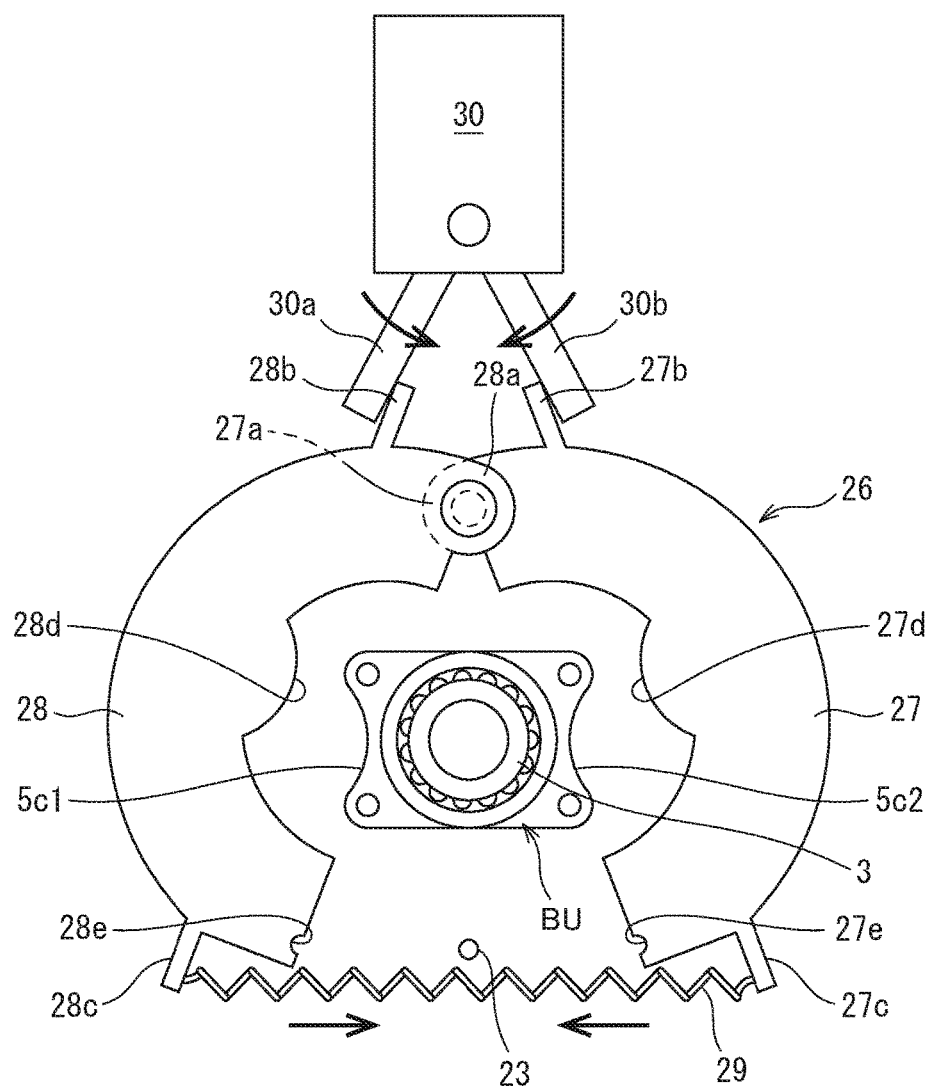
FIG. 3 is a view illustrating a state where a holding part of the device of the first embodiment according to the present invention is in an opening state around a bearing unit BU.

In the bearing unit BU, a first-row tapered roller bearing 8 including an inner ring raceway 2a of the inner ring 2, an outer ring raceway 5a of the outer ring 5, and a plurality of tapered rollers 6a, and a second-row tapered roller bearing 9 including an inner ring raceway 3a of the inner ring 3, an outer ring raceway 5b of the outer ring 5, and a plurality of tapered rollers 6a are integrated with a cylindrically-shaped connecting member 15 made of a synthetic resin. Since the outer diameter of the connecting member 15 is set to be slightly larger than the inner diameters of the inner ring 2 and the inner ring 3, the inner diameter surfaces of the inner ring 2 and the inner ring 3 are grasped by frictional force, and the inner ring 2 and the inner ring 3 are prevented from falling off during conveyance. In addition, there is no need to separately press-fit the first-row and second-row tapered roller bearings 8, 9 to the hub main body 1 in press-fitting work, and the cycle time of the press-fitting work can be reduced. As illustrated in FIG. 3, on the outer periphery of a supporting/fixing part 5c supported and fixed by a suspension device (not illustrated) of the outer ring 5, a pair of concave parts 5c1, 5c2 dented inwardly in the radial direction in the axial symmetry position when viewing the bearing unit BU from the axial direction is formed.

The block-shaped hub main body-placing unit 10 having a flat upper surface and a ring-shaped bearing stand 18 surrounding the outer periphery of the hub main body-placing unit 10 are fixed on a device base stand 16.

A plurality of concave parts 10a for screws are formed on a predetermined circle on the upper surface of the hub main body-placing unit 10, and a concave part 10b for an external cylindrical part is formed on the inside of the concave parts 10a for screws.

Fixation screws 17 screwed in a plurality of penetration screw holes 1d formed in a flange 1c of the hub main body 1 are entered into the plurality of concave parts 10a for screws and an external cylindrical part 1e of the hub main body 1 is entered into the concave part 10b for an external cylindrical part, so that the hub main body 1 is placed in a state where the flange 1c is in contact with the top of the hub main body-placing unit 10 and the hollow cylindrical part 1a extends upward.

Figure 2:
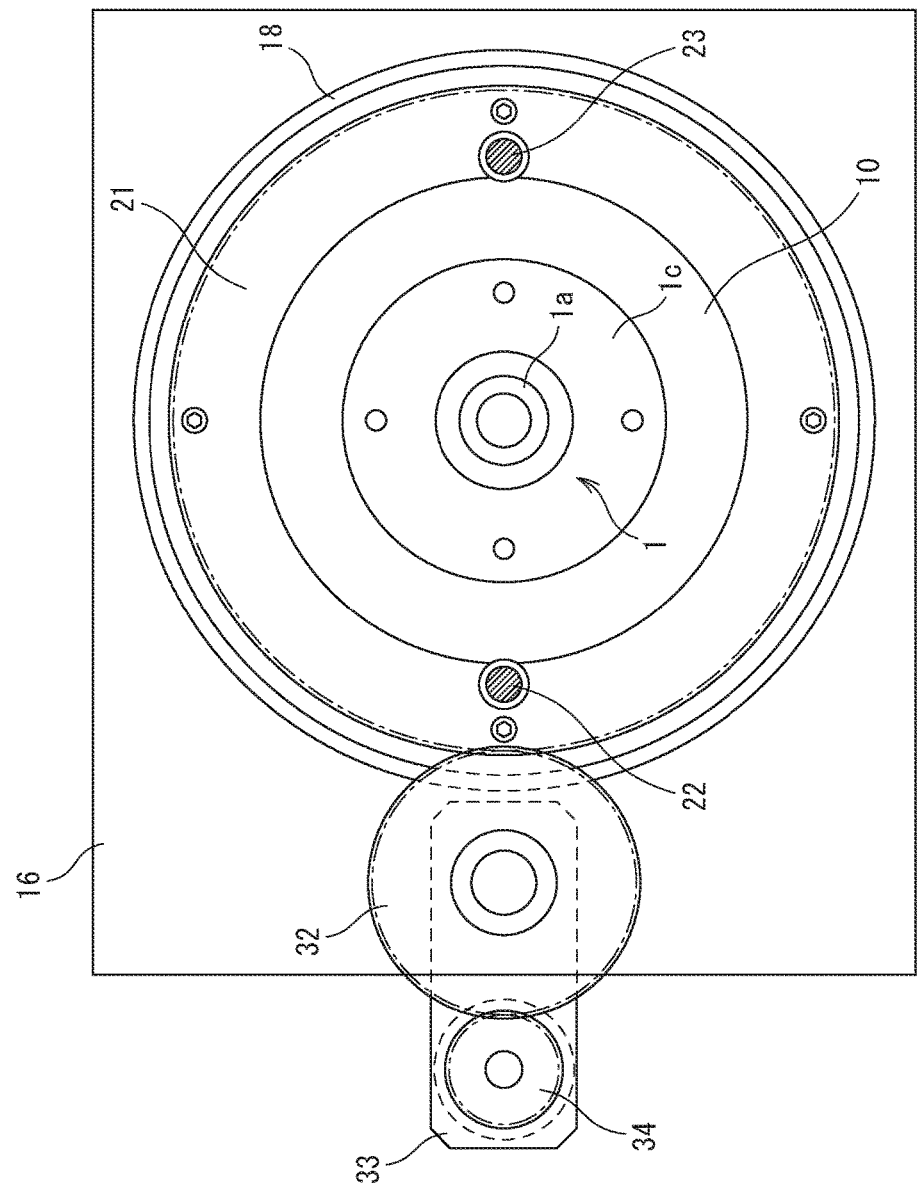
FIG. 2 is an arrow view taken along a line A-A of FIG. 1.

As illustrated in FIG. 1 and FIG. 2, the bearing setting unit 12 is arranged above the bearing stand 18 through a ball bearing 19 and a gear receiving member 20, and includes a ring-shaped driven gear 21 that is rotatable around the rotation axis in the vertical direction, first and second rotation-transmitting shafts 22, 23 that rise vertically from the upper surface of the driven gear 21 and are fixed, supporting coil springs 24, 25 that are arranged on the outer peripheries of the first and second rotation-transmitting shafts 22, 23, and a holding part 26 that is supported by the first and second rotation-transmitting shafts 22, 23, and the supporting coil springs 24, 25 and holds the bearing unit BU so as to be coaxial with respect to the hollow cylindrical part 1a in the upper position of the hollow cylindrical part 1a of the hub main body 1.

Figure 4:
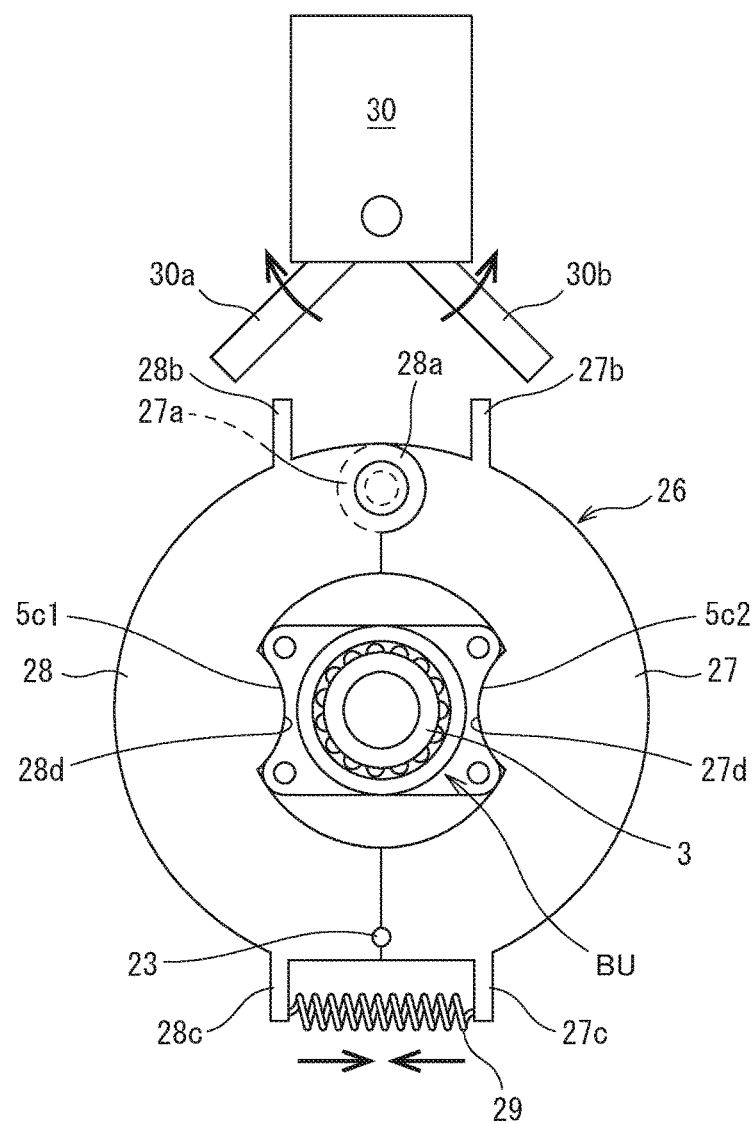
FIG. 4 is an arrow view taken along a line B-B of FIG. 1.
Figure 5:
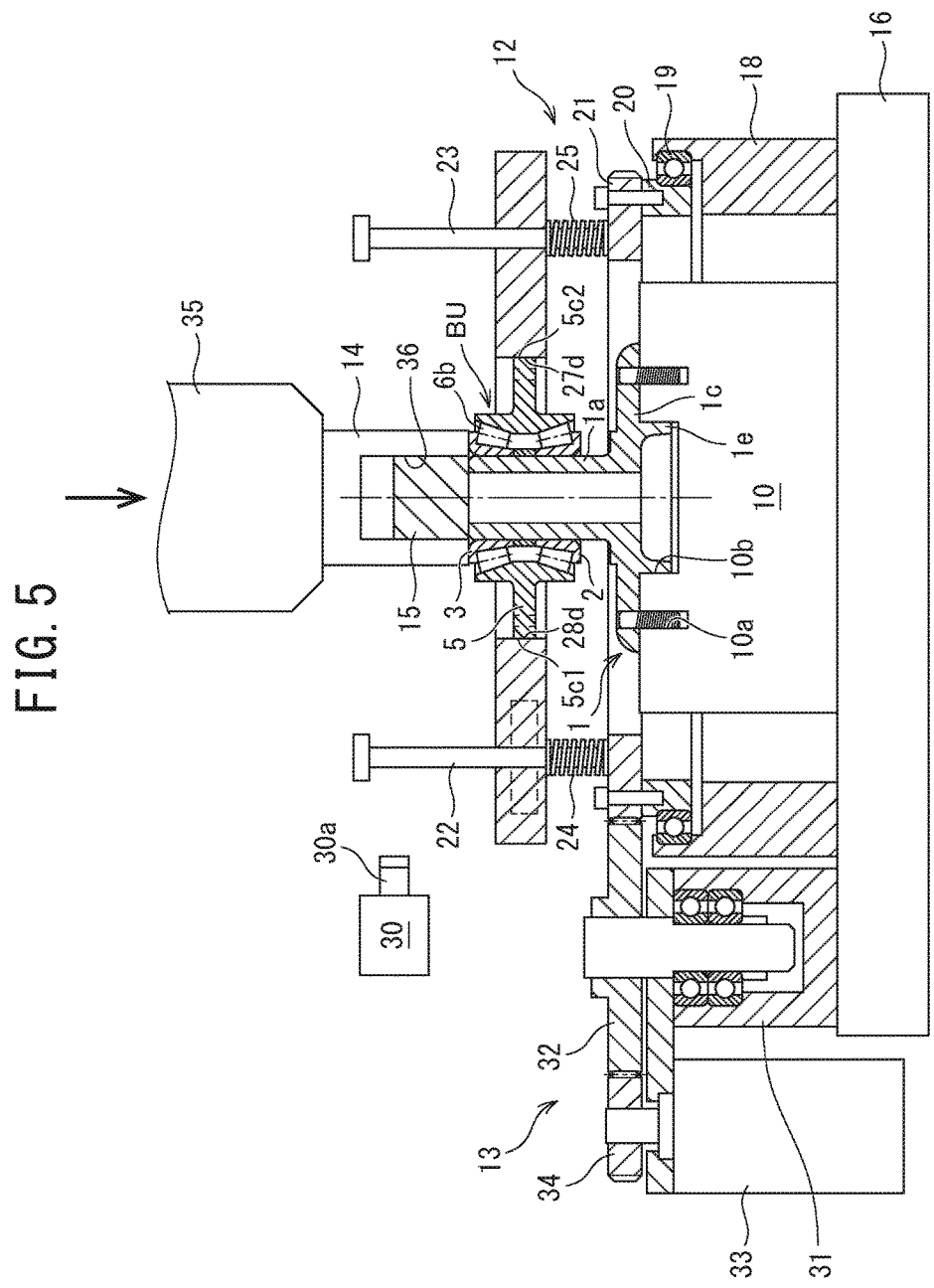
FIG. 5 is a view illustrating a state where inner rings are externally fit to a cylindrical part of a hub main body by rotating an outer ring while stopping the rotation of the inner rings, in the device of the first embodiment according to the present invention.

As illustrated in FIG. 3 and FIG. 4, the holding part 26 includes a pair of semicircular members 27, 28.

The pair of semicircular members 27, 28 includes hinge parts 27a, 28a that are formed on one end side where each circular arc part and each chord part intersect and turn around the first rotation-transmitting shaft 22, lever engagement parts 27b, 28b that are formed to protrude outwardly from the side of the hinge parts 27a, 28a, spring lock parts 27c, 28c that are formed to protrude on the other end side where each circular arc part and each chord part of the pair of semicircular members 27, 28 intersect, circular arc-shaped outer ring-holding surfaces 27d, 28d that are formed on the chord parts of the pair of semicircular members 27, 28 and protrude inwardly in the radial direction, semicircular arc-shaped rotation-transmitting shaft engagement surfaces 27e, 28e that are formed on the chord parts of the pair of semicircular members 27, 28 on the other end side, and an outer ring-holding coil spring 29 whose both ends are locked between the spring lock parts 27c, 28c.

In addition, an opening/closing device 30 including opening operation levers 30a, 30b is arranged in the vicinity of the lever engagement parts 27b, 28b of the holding part 26.

The pair of semicircular members 27, 28 of the holding part 26 performs an opening/closing operation (opening operation in FIG. 3, closing operation in FIG. 4) in a horizontal direction with the pair of hinge parts 27a, 28a as a turn center.

In the closing operation of the pair of semicircular members 27, 28 illustrated in FIG. 4, tensile force is made to act on the outer ring-holding coil spring 29 in a direction in which the spring lock parts 27c, 28c are made to come close to each other, so that the outer ring-holding surfaces 27d, 28d of the semicircular members 27, 28 hold the bearing unit BU in a state of being in surface contact with the concave parts 5c1, 5c2 of the outer ring 5.

As illustrated in FIG. 3, when the opening operation levers 30a, 30b of the opening/closing device 30, which are engaged with the lever engagement parts 27b, 28b, are driven in a direction in which the opening operation levers 30a, 30b come close to each other, the pair of semicircular members 27, 28 performs the opening operation while resisting the tensile force of the outer ring-holding coil spring 29, and the outer ring-holding surfaces 27d, 28d are separated from the outer peripheral surface of the outer ring 5.

As illustrated in FIG. 1 and FIG. 2, the rotational drive source 13 is rotatably supported by a gear supporting part 31 arranged on the device base stand 16, and includes an intermediate gear 32 meshed with the driven gear 21 of the bearing setting unit 12, a rotary motor 33 supported by the gear supporting part 31, and a driving gear 34 of the rotary motor 33, which is meshed with the intermediate gear 32.

Furthermore, as illustrated in FIG. 1, the inner-ring press-fitting unit 14 is provided below a lifting/lowering means 35, and when the lifting/lowering means 35 is lowered, the inner-ring press-fitting unit 14 is in contact with the upper end surface of the inner ring 3 of the bearing unit BU, and the inner rings 2, 3 are externally fit to the hollow cylindrical part 1a of the hub main body 1. In addition, in the inner-ring press-fitting unit 14, a housing concave part 36 into which the connecting member 15 can be entered is formed to open downward.

Next, a procedure for assembling the bearing unit BU into the hub main body 1 using the assembling device of a wheel hub unit of the first embodiment according to the present invention will be described.

First, the opening operation levers 30a, 30b of the opening/closing device 30, which are engaged with the lever engagement parts 27b, 28b, are driven in a direction in which the opening operation levers 30a, 30b come close to each other, so that the pair of semicircular members 27, 28 of the holding part 26 performs an opening operation.

After that, the fixation screws 17 that protrude downward from the flange 1c of the hub main body 1 are inserted into the concave parts 10a for screws of the hub main body-placing unit 10 and the external cylindrical part 1e of the hub main body 1 is inserted into the concave part 10b for an external cylindrical part of the hub main body-placing unit 10, so that the hub main body 1 is placed on the hub main body-placing unit 10 such that the hollow cylindrical part 1a faces upward.

After that, the engagement of the lever engagement parts 27b, 28b of the holding part 26 by the opening operation levers 30a, 30b of the opening/closing device 30 is released and tensile force is made to act on the outer ring-holding coil spring 29, so that the pair of semicircular members 27, 28 becomes a closed state.

After that, the bearing unit BU whose axis is oriented in the vertical direction is arranged inside the pair of semicircular members 27, 28 of the holding part 26, so that the outer ring-holding surfaces 27d, 28d of the semicircular members 27, 28 hold the bearing unit BU in a state of being in surface contact with the concave parts 5c1, 5c2 of the outer ring 5 (refer to FIG. 1 and FIG. 4).

After that, when the inner-ring press-fitting unit 14 is lowered toward the hollow cylindrical part 1a by a lowering operation of the lifting/lowering means 35, the bearing unit BU is pressed downward by the inner-ring press-fitting unit 14, and the holding part 26 that holds the bearing unit BU is lowered along the first and second rotation-transmitting shafts 22, 23 while the supporting coil springs 24, 25 are gradually compressed. Then, the rotary motor 33 of the rotational drive source 13 is driven at the same time as the inner ring 2 of the bearing unit BU comes into contact with the uppermost part of the hollow cylindrical part 1a of the hub main body 1.

Then, when the inner ring 2 comes into contact with the uppermost part of the hollow cylindrical part 1a of the hub main body 1 and the rotary motor 33 is driven, the rotation of the driving gear 34 is transmitted to the driven gear 21 of the bearing setting unit 12 through the intermediate gear 32, and the rotation of the driven gear 21 is transmitted to the holding part 26 through the first and second rotation-transmitting shafts 22, 23. Then, the bearing unit BU held by the holding part 26 also rotates.

It is to be noted that a means for detecting that the inner ring 2 of the bearing unit BU comes into contact with the uppermost part of the hollow cylindrical part 1a of the hub main body 1 is based on the preset amount of the holding part 26 (the pair of semicircular members 27, 28) of the bearing setting unit 12 lowered.

Although the outer ring 5 of the bearing unit BU rotates by the rotating holding part 26, the inner ring 2 does not rotate because of being in contact with and pressed against the upper end surface of the hollow cylindrical part 1a at rest. In addition, similarly, the inner ring 3 connected to the inner ring 2 by the connecting member 15 also does not rotate.

Figure 20A:
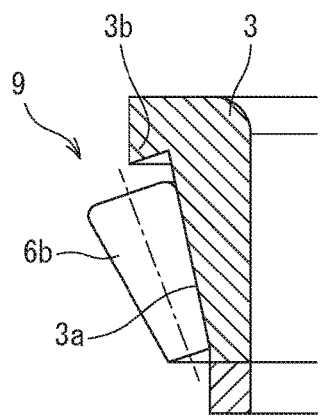
FIG. 20A is a view illustrating a state where a tapered roller of a tapered roller bearing is arranged with the end surface thereof in the axial direction not being in contact with a stepped part.
Figure 20B:
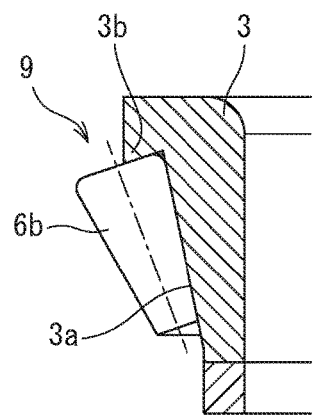
FIG. 20B is a view illustrating a state where the tapered roller is arranged at a true position with the end surface thereof in the axial direction being in contact with the stepped part.

In this manner, the outer ring 5 is relatively rotated in a state where the inner rings 2, 3 do not rotate, so that the tapered rollers 6a, 6b roll and aligning action is implemented on the tapered rollers 6a, 6b, and thus, the tapered rollers 6a, 6b are arranged at the true position as illustrated in FIG. 20B. The lifting/lowering means 35 is lowered in this state, so that the inner-ring press-fitting unit 14 pushes the bearing unit BU and the bearing setting unit 12 downward through the inner rings 2, 3.

The holding part 26 of the bearing setting unit 12 is lowered along the first and second rotation-transmitting shafts 22, 23 while the supporting coil springs 24, 25 are gradually compressed. In this process, the connecting member 15 that is internally fit to the two inner rings 2, 3 of the bearing unit BU is pressed by the upper end of the hollow cylindrical part 1a to be entered into the housing concave part 36 of the inner-ring press-fitting unit 14, and the inner rings 2, 3 are press-fit to the hollow cylindrical part 1a. Then, when the lower end of the inner ring 2 is in contact with the base of the hollow cylindrical part 1a, the assembly of the bearing unit BU into the hub main body 1 is completed.

In order to remove the wheel hub unit whose assembly has been completed from the assembling device of a wheel hub unit, first, the holding part 26 of the bearing setting unit 12 is rotated such that the lever engagement parts 27b, 28b are located below the opening operation levers 30a, 30b of the opening/closing device 30.

After that, the inner-ring press-fitting unit 14 is moved upward by a lifting operation of the lifting/lowering means 35. When the inner-ring press-fitting unit 14 is lifted, the holding part 26 that holds the wheel hub unit is also lifted along the first and second rotation-transmitting shafts 22, 23 while the supporting coil springs 24, 25 are gradually elongated.

Then, when the holding part 26 stops at a position of the uppermost part of the first and second rotation-transmitting shafts 22, 23, the wheel hub unit is grasped by a carrier device (not illustrated). At the same time, the lever engagement parts 27b, 28b of the holding part 26 perform the opening operation of the pair of semicircular members 27, 28 of the holding part 26 of the opening/closing device 30. In addition, in the case where a carrier device is not used, the opening operation of the pair of semicircular members 27, 28 is performed in a state where a worker grasps the wheel hub unit with a hand.

Next, the operation and effect when the wheel hub unit is assembled using the above-described assembling device of a wheel hub unit of the first embodiment will be described.

According to the present embodiment, the bearing unit BU is set in the holding part 26 of the bearing setting unit 12, so that the bearing unit BU is arranged coaxially with the hollow cylindrical part 1a of the hub main body 1 placed on the hub main body-placing unit 10. Then, the inner-ring press-fitting unit 14 lowers the bearing unit BU and the bearing setting unit 12 toward the hollow cylindrical part 1a of the hub main body 1 by the lowering operation of the lifting/lowering means 35. Accordingly, the holding part 26 is moved toward the hollow cylindrical part 1a along the first and second rotation-transmitting shafts 22, 23 while the supporting coil springs 24, 25 are gradually compressed.

When the inner ring 2 of the bearing unit BU comes into contact with the uppermost part of the hollow cylindrical part 1a of the hub main body 1, the rotary motor 33 of the rotational drive source 13 is driven. The rotational force of the rotational drive source 13 is transmitted to the driven gear 21 of the bearing setting unit 12, and is transmitted to the holding part 26 and the outer ring 5 through the first and second rotation-transmitting shafts 22, 23. The inner rings 2, 3 of the bearing unit BU cannot rotate because of being pressed against the hollow cylindrical part 1a at rest, and therefore, the outer ring 5 is relatively rotated to the inner rings 2, 3, the tapered rollers 6a, 6b roll and the aligning action is implemented, the tapered rollers 6a, 6b are arranged at the true position as illustrated in FIG. 20B, and the bearing unit BU is incorporated in the hollow cylindrical part 1a.

Therefore, the bearing setting unit 12 has a function of arranging the bearing unit BU coaxially with the hollow cylindrical part 1a of the hub main body 1 and moving the bearing unit BU toward the hollow cylindrical part 1a, the rotational drive source 13 has a function of transmitting the rotational force to the bearing unit BU held by the bearing setting unit 12, and the inner-ring press-fitting unit 14 has a function of externally fitting the inner rings 2, 3 to the hollow cylindrical part 1a by driving of the lifting/lowering means 35, so that the assembling device of a wheel hub unit of the present embodiment includes a specific device configuration that makes the inner rings 2, 3 be externally fit to the hollow cylindrical part 1a while transmitting the rotational force to the outer ring 5. The bearing unit BU can be assembled into the hollow cylindrical part 1a of the hub main body 1 in short working time and in small working man-hours by using these devices, and thus, the wheel hub unit can be efficiently assembled.

In addition, the holding part 26 configuring the bearing setting unit 12 includes the hinge parts 27a, 28a that turn around the first rotation-transmitting shaft 22, and includes the pair of semicircular members 27, 28 that is openable/closable in a direction perpendicular to the first rotation-transmitting shaft 22, and tensile force is made to act on the outer ring-holding coil spring 29 in a direction in which the spring lock parts 27c, 28c are made to come close to each other, so that the outer ring-holding surfaces 27d, 28d of the semicircular members 27, 28 hold the bearing unit BU in a state of being in surface contact with the concave parts 5c1, 5c2 of the outer ring 5. Therefore, the assembling device of a wheel hub unit of the present embodiment can easily perform an operation of holding the bearing unit BU in the holding part 26 and an operation of removing the bearing unit BU from the holding part 26 and grasping the bearing unit BU.

[Second Embodiment]

Figure 6:
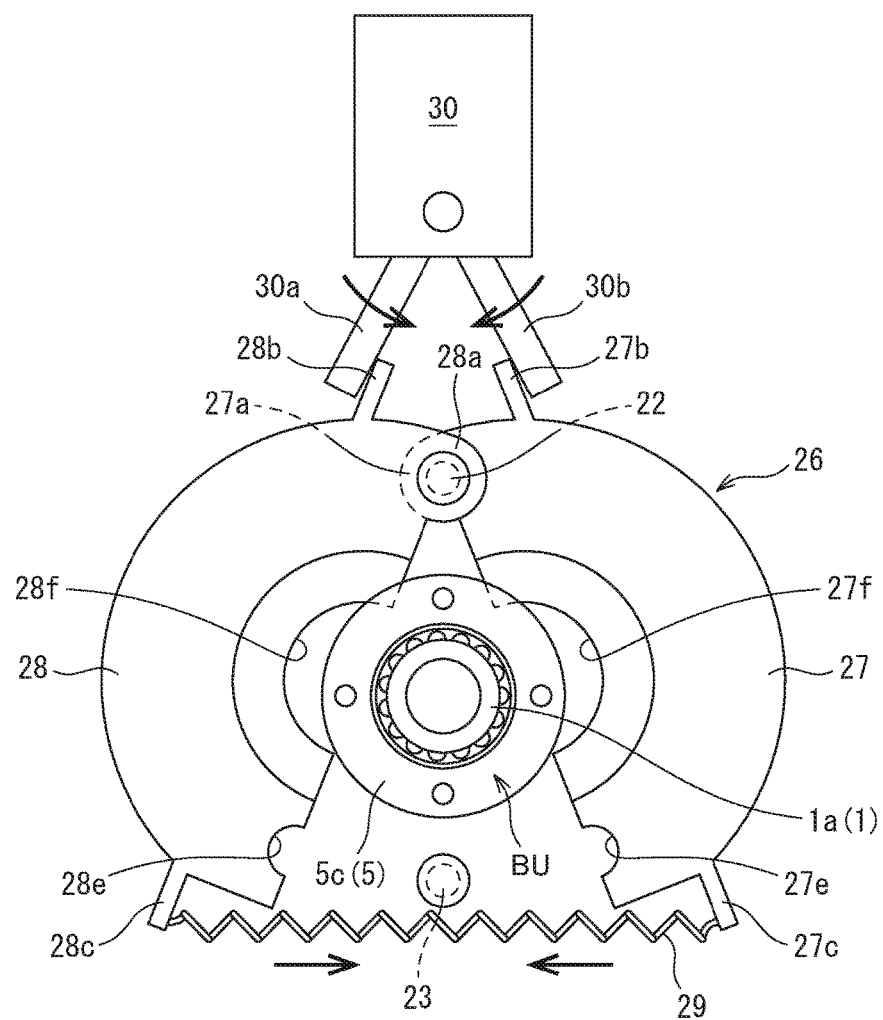
FIG. 6 is a view illustrating an opening operation of an outer ring-holding part of an assembling device of a wheel hub unit of a second embodiment according to the present invention.
Figure 7:
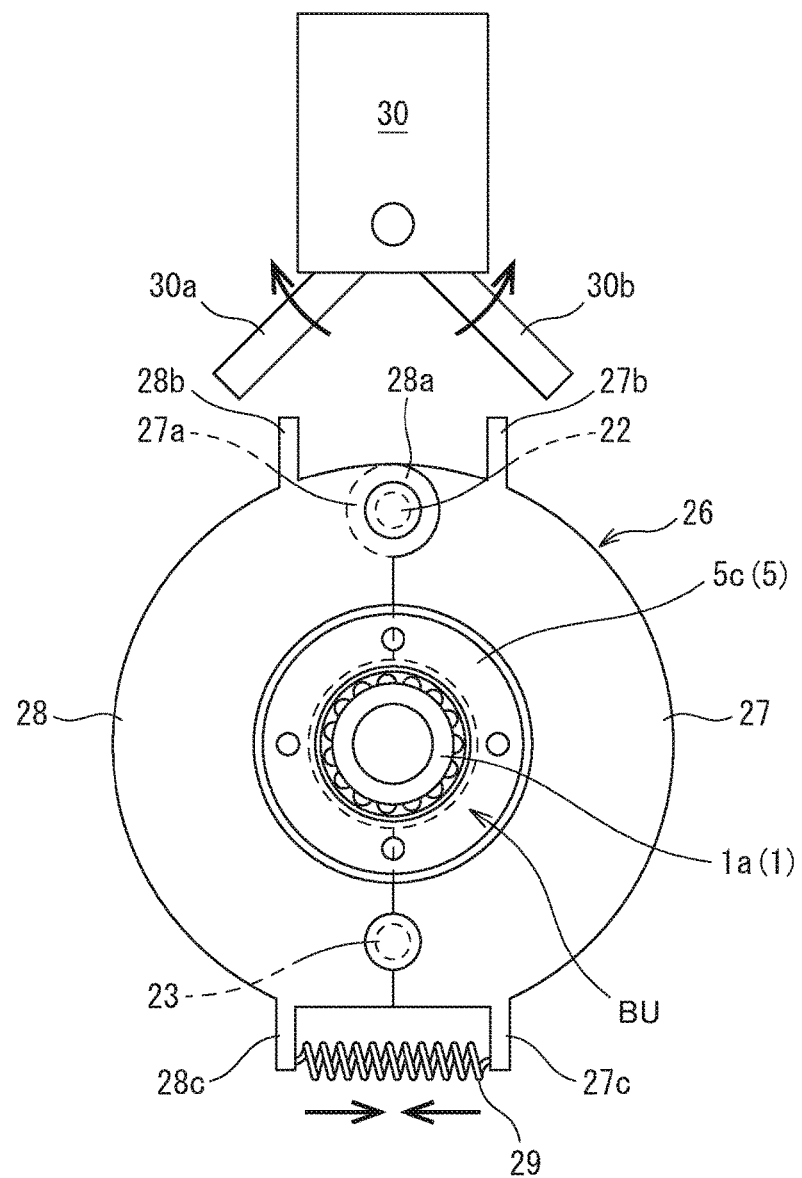
FIG. 7 is a view illustrating a closing operation of the outer ring-holding part of the second embodiment according to the present invention.
Figure 8:
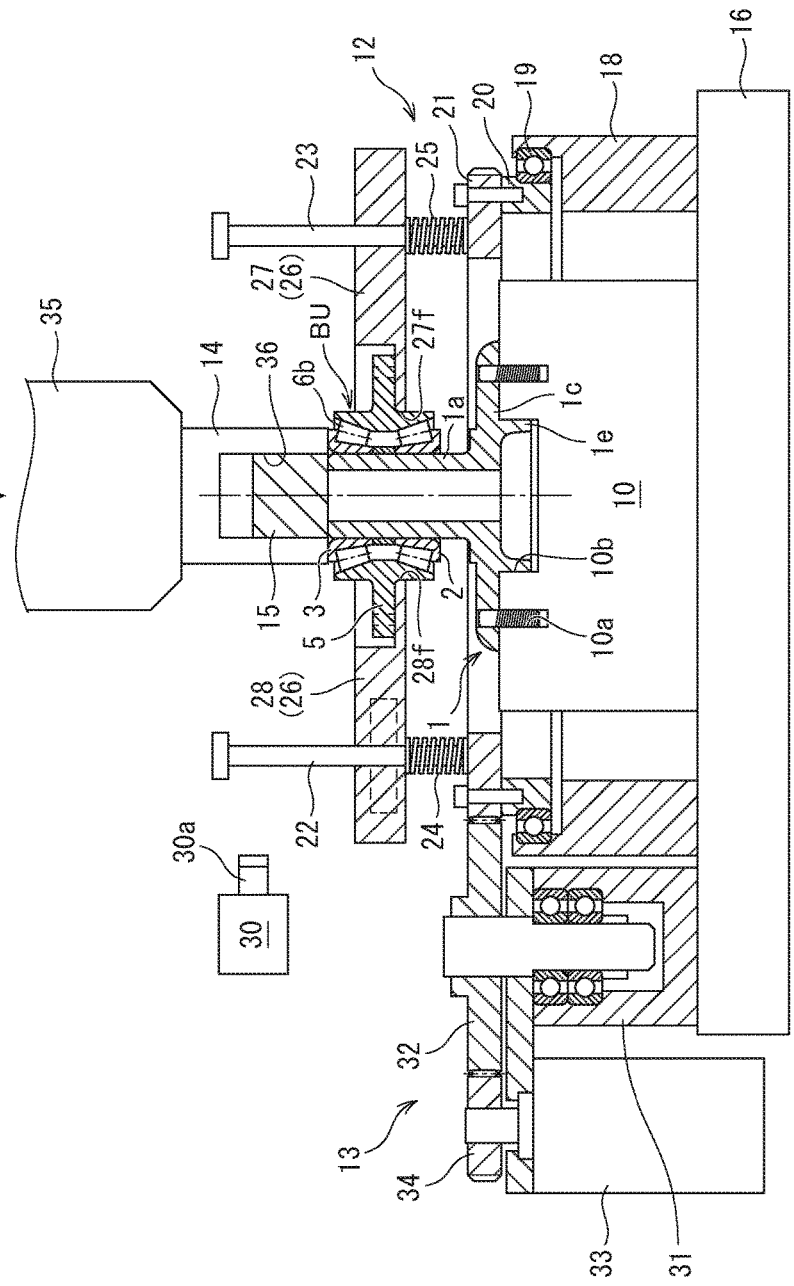
FIG. 8 is a view illustrating a state where the inner rings are externally fit to the cylindrical part of the hub main body by rotating the outer ring while stopping the rotation of the inner rings, in the device of the second embodiment according to the present invention.

FIG. 6 to FIG. 8 illustrate an assembling device of a wheel hub unit of a second embodiment according to the present invention. It is to be noted that the same components as the devices of the first embodiment illustrated in FIG. 1 to FIG. 5 are denoted by the same reference numerals, and the description thereof will be omitted.

The supporting/fixing part 5c of the outer ring 5 configuring the bearing unit BU of the present embodiment is formed to have a circular shape as illustrated in FIG. 6.

In addition, in the holding part 26 of the present embodiment, semi-circular arc-shaped outer ring-holding surfaces 27f, 28f are formed on the chord parts of the pair of semicircular members 27, 28.

In the closing operation of the pair of semicircular members 27, 28 illustrated in FIG. 7, tensile force is made to act on the outer ring-holding coil spring 29 in a direction in which the spring lock parts 27c, 28c are made to come close to each other, so that the outer ring-holding surfaces 27f, 28f of the semicircular members 27, 28 hold the bearing unit BU in a state of being in surface contact with the outer peripheral surface (the outer peripheral surface at a position where the outer ring raceway 5b is formed) of the outer ring 5.

When assembling the bearing unit BU into the hub main body 1 using the assembling device of a wheel hub unit of the second embodiment, the opening operation levers 30a, 30b of the opening/closing device 30 are driven in a direction in which the opening operation levers 30a, 30b are spaced apart from each other, so that the engagement with the lever engagement parts 27b, 28b is released. Accordingly, tensile force is made to act on the outer ring-holding coil spring 29 of the holding part 26, so that the outer ring-holding surfaces 27f, 28f of the semicircular members 27, 28 hold the bearing unit BU in a state of being in surface contact with the outer peripheral surface of the outer ring 5 (refer to FIG. 7 and FIG. 8).

The unique operation and effect of the present embodiment will be described.

The holding part 26 configuring the bearing setting unit 12 includes the hinge parts 27a, 28a that turn around the first rotation-transmitting shaft 22, and includes the pair of semicircular members 27, 28 that is openable/closable in a direction perpendicular to the first rotation-transmitting shaft 22, and tensile force is made to act on the outer ring-holding coil spring 29 in a direction in which the spring lock parts 27c, 28c are made to come close to each other, so that the outer ring-holding surfaces 27d, 28d of the semicircular members 27, 28 hold the bearing unit BU in a state of being in surface contact with the outer peripheral surface of the outer ring 5. Therefore, the assembling device of a wheel hub unit of the present embodiment can easily perform an operation of holding the bearing unit BU in the holding part 26 and an operation of removing the bearing unit BU from the holding part 26 and grasping the bearing unit BU.

In addition, unlike the first embodiment, in the present embodiment, there is no need to adjust the phase of the outer ring 5 to the outer ring-holding surfaces 27f, 28f when placing the bearing unit BU in the bearing setting unit 12, and thus, the closing operation of the holding part 26 can be performed without adjusting the phase of the outer ring 5, and the simplification of the device and the reduction in the cycle time can be achieved.

[Third Embodiment]

Next, FIG. 9 to FIG. 16 illustrate an assembling device of a wheel hub unit of a third embodiment according to the present invention. It is to be noted that the same components as those of the first embodiment illustrated in FIG. 1 to FIG. 5 are denoted by the same reference numerals, and the description thereof will be omitted.

Figure 9:
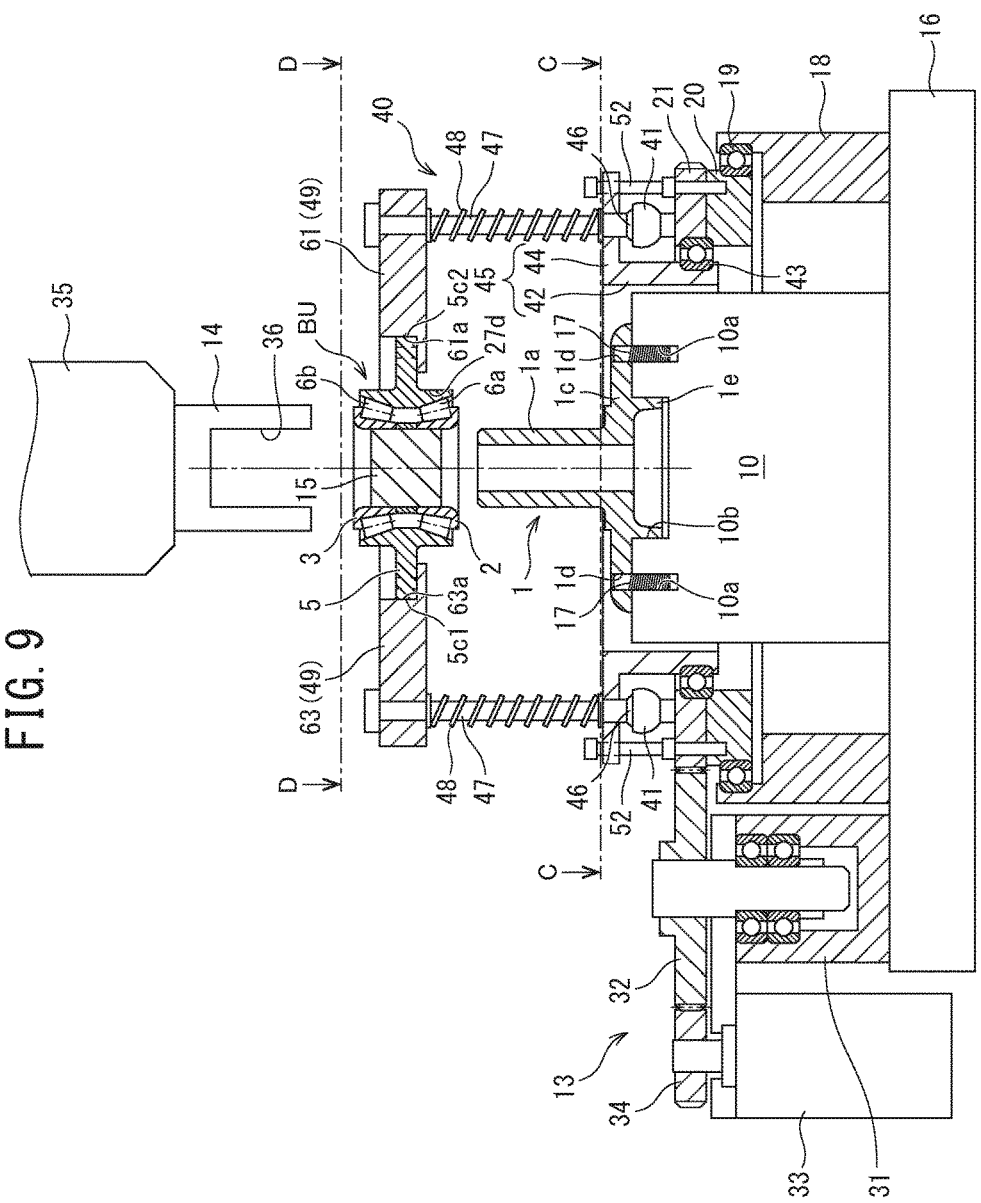
FIG. 9 is an essential part cross-sectional view illustrating an assembling device of a wheel hub unit of a third embodiment according to the present invention.

As illustrated in FIG. 9, the assembling device of a wheel hub unit of the present embodiment includes the hub main body-placing unit 10, a bearing setting unit 40 which sets the tapered roller bearing unit BU in the upper position of the hollow cylindrical part 1a such that the bearing unit BU can be lowered, the rotational drive source 13 which transmits rotational force to the outer ring 5 of the bearing unit BU set in the bearing setting unit 40, and the inner-ring press-fitting unit 14 which lowers the bearing unit BU set in the bearing setting unit 40, so that the inner rings 2, 3 are externally fit to the hollow cylindrical part 1a.

Figure 14:
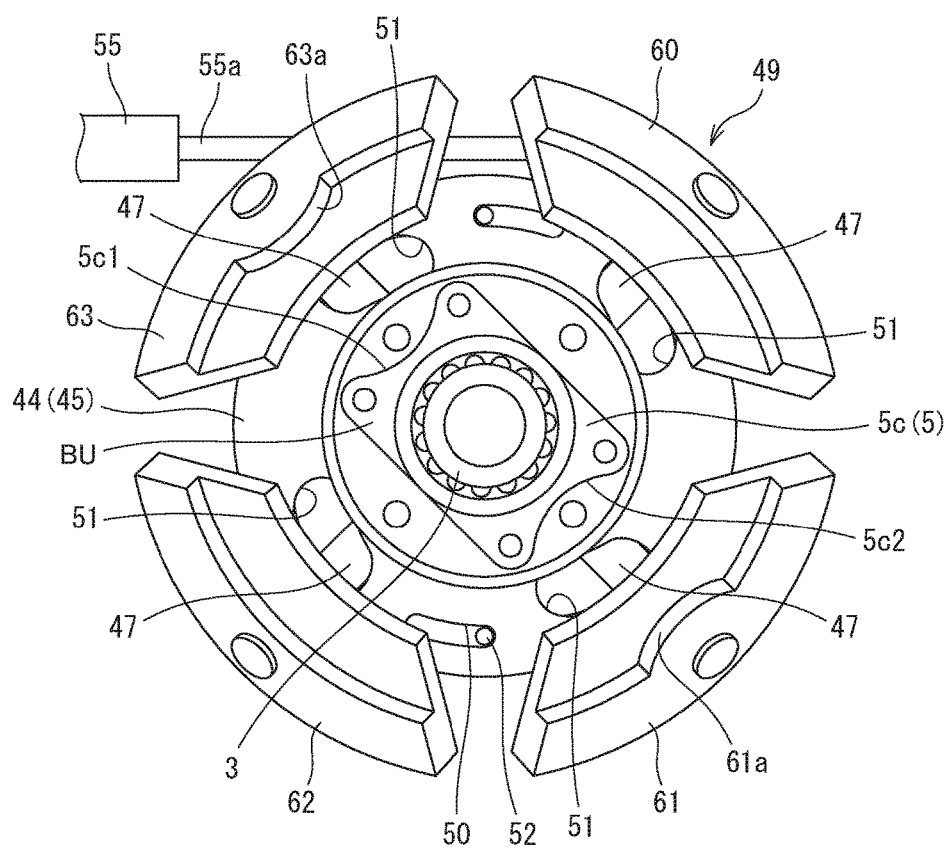
FIG. 14 is a view illustrating a state where four fan-shaped members configuring the holding part of the third embodiment according to the present invention are moved outwardly in the radial direction.
Figure 15:
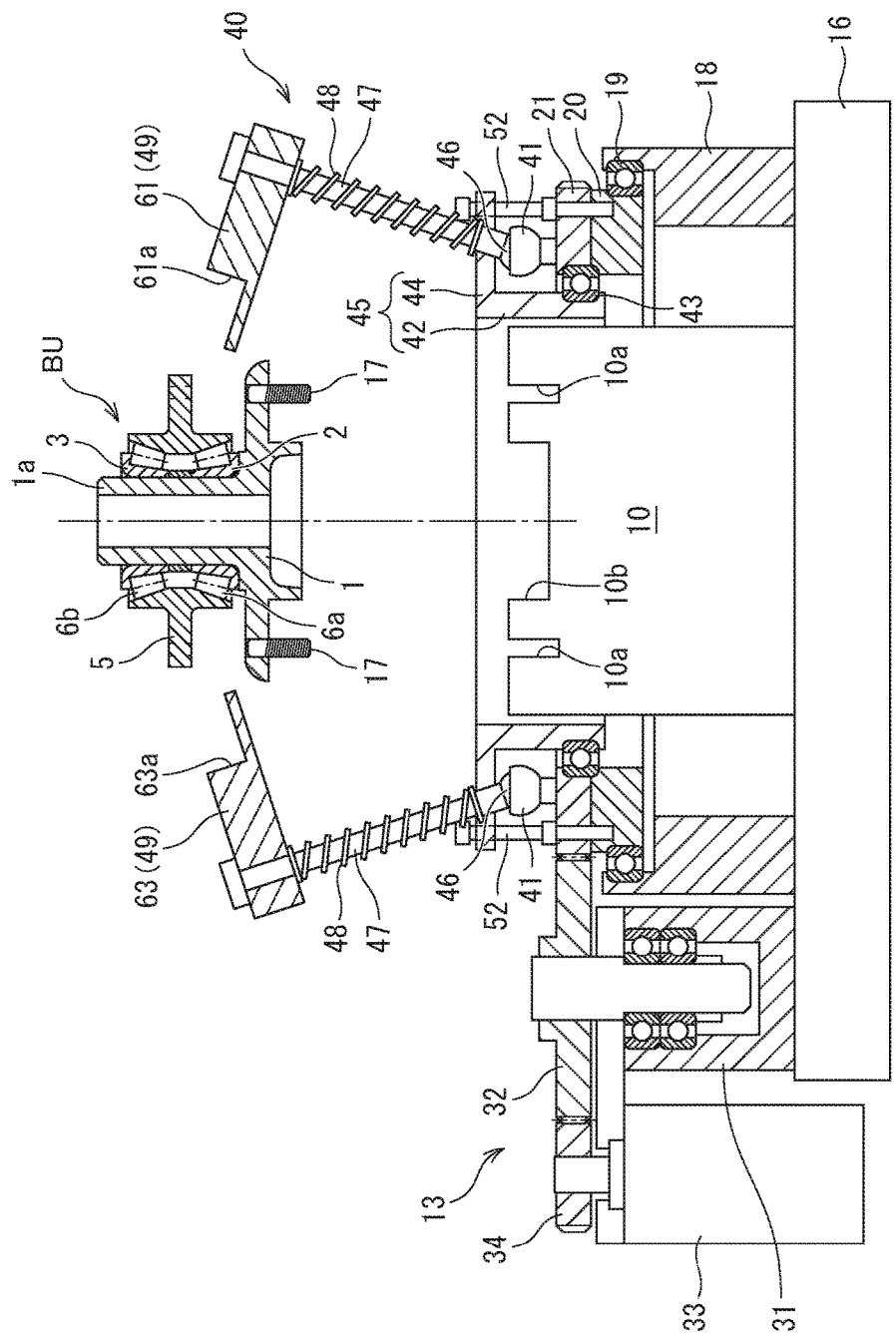
FIG. 15 is a view illustrating a configuration of the entire device when the four fan-shaped members of the third embodiment according to the present invention are moved outwardly in the radial direction.
Figure 16:
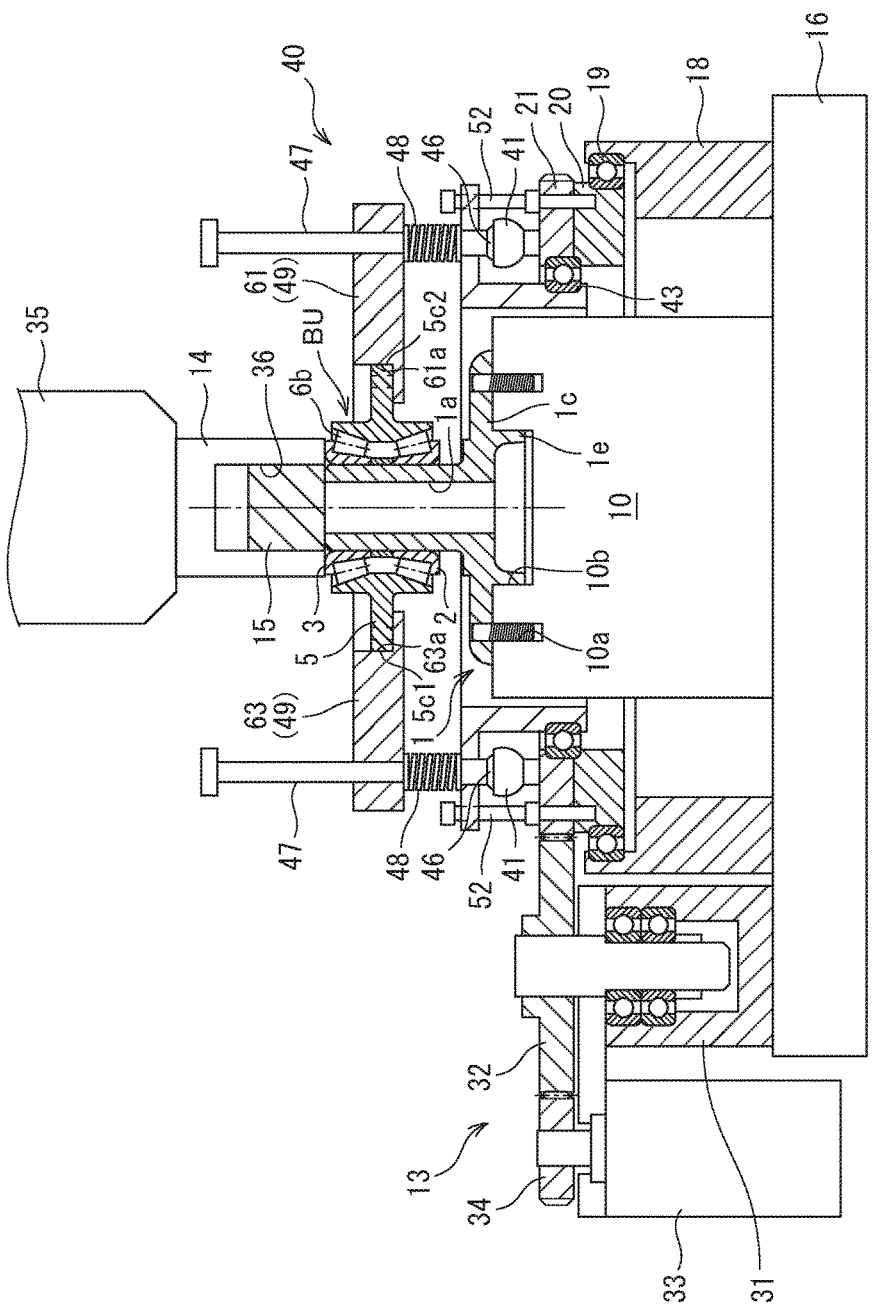
FIG. 16 is a view illustrating a state where the inner rings are externally fit to the cylindrical part of the hub main body by rotating the outer ring while stopping the rotation of the inner rings, in the device of the third embodiment according to the present invention.

The bearing unit BU has the same structure as the first embodiment, and, as illustrated in FIG. 14, on the outer periphery of the supporting/fixing part 5c supported and fixed by a suspension device (not illustrated) of the outer ring 5, the pair of concave parts 5c1, 5c2 dented inwardly in the radial direction in the axial symmetry position when viewing the bearing unit BU from the axial direction is formed.

The bearing setting unit 40 is arranged above the bearing stand 18 through the ball bearing 19 and the gear receiving member 20, and includes the ring-shaped driven gear 21 that is rotatable around the rotation axis in the vertical direction, four spherical receiving seats 41 that are fixed on the upper surface of the driven gear 21 at a predetermined interval in the circumferential direction, a holding part opening/closing member 45 in which a cylindrical part 42 is rotatably arranged through a ball bearing 43 arranged on the inner surface of the driven gear 21 and an axis-tilting plate 44 is connected to the upper end of the cylindrical part 42 parallel to the driven gear 21, four rotation-transmitting shafts 47 that penetrate the axis-tilting plate 44 and rise upward, in which spherical parts 46 are turnably connected to the four spherical receiving seats 41 arranged on the upper surface of the driven gear 21, supporting coil springs 48 that are arranged on the outer peripheries of the four rotation-transmitting shafts 47, and a holding part 49 that is supported by the four rotation-transmitting shafts 47 and the supporting coil springs 48 and holds the bearing unit BU so as to be coaxial with respect to the hollow cylindrical part 1a in the upper position of the hollow cylindrical part 1a of the hub main body 1.

Figure 10:
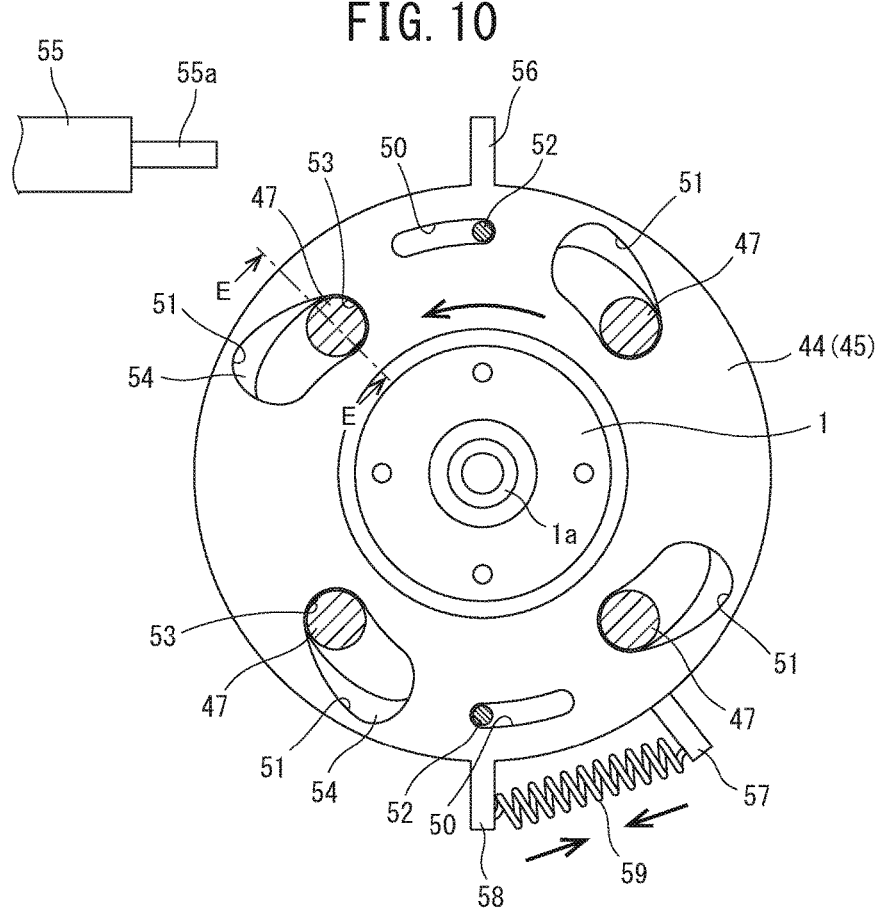
FIG. 10 is an arrow view taken along a line C-C of FIG. 9.
Figure 11:
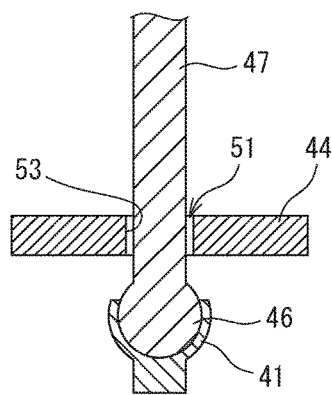
FIG. 11 is an arrow view taken along a line E-E of FIG. 10.

As illustrated in FIG. 10, a plurality of rotation guide slits 50 and tilt guide slits 51 whose longitudinal direction extends in the circumferential direction are formed in the axis-tilting plate 44 of the holding part opening/closing member 45.

A guide pin 52 (refer to FIG. 9) that rises from the upper surface of the driven gear 21 in the vertical direction penetrates the rotation guide slit 50, and the guide pin 52 is engaged with the end part of the rotation guide slit 50 in the longitudinal direction, so that the rotation angle of the axis-tilting plate 44 is regulated.

The rotation-transmitting shafts 47 penetrate the tilt guide slits 51 at four sites. At one end of the tilt guide slit 51 in the longitudinal direction, an inner wall 53 is formed such that the slit penetrates in the vertical direction (refer to FIG. 11), and an inner wall 54 whose inclination is gradually increased outwardly in the radial direction toward the other end from the one end of the tilt guide slit 51 in the longitudinal direction is formed (refer to FIG. 13).

Figure 12:
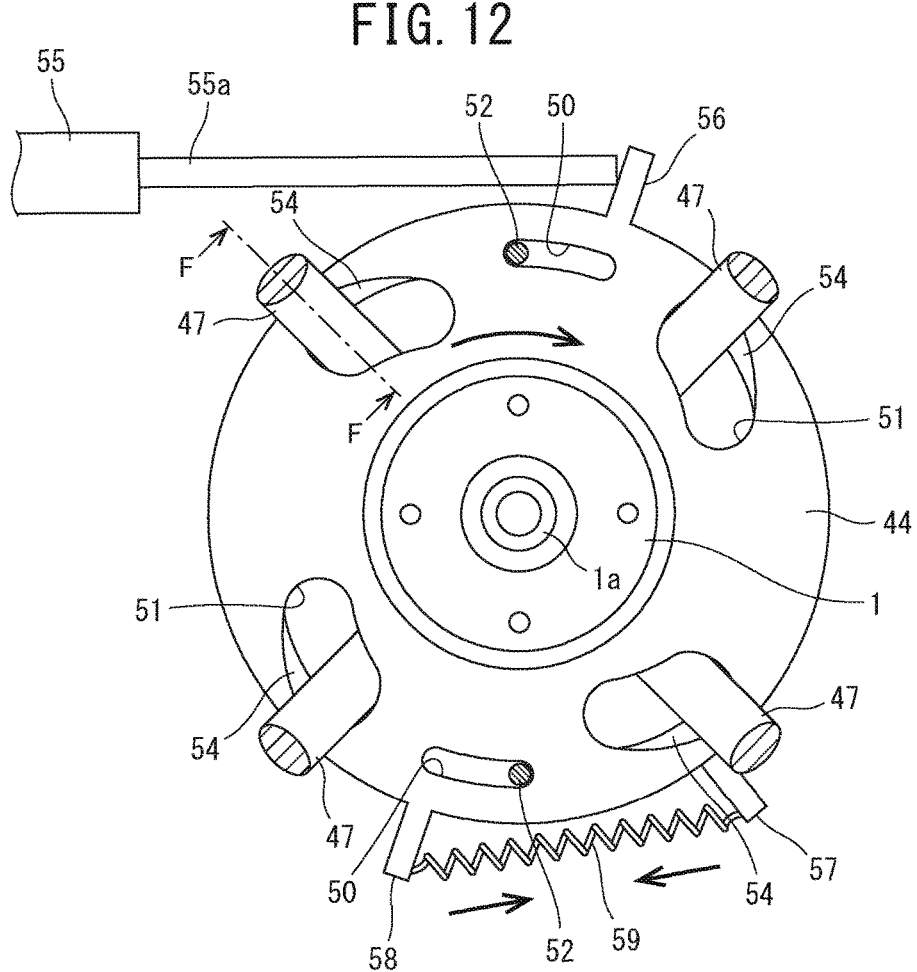
FIG. 12 is a view illustrating a state where four rotation-transmitting shafts of the third embodiment according to the present invention are inclined in the radial direction.
Figure 13:
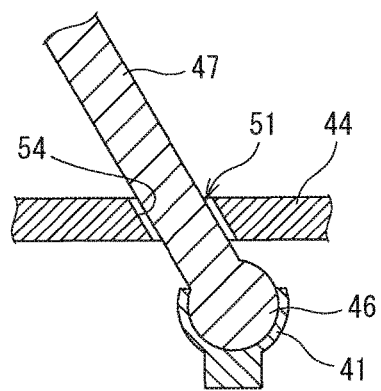
FIG. 13 is an arrow view taken along a line F-F of FIG. 12.

In addition, as illustrated in FIG. 10, a cylinder 55 is arranged in the vicinity of the holding part opening/closing member 45, and a cylinder engagement part 56 is formed to protrude on the outer periphery of the axis-tilting plate 44 of the holding part opening/closing member 45 at a position where a cylinder rod 55a of the cylinder 55 is stroked to be engaged (refer to FIG. 12). Furthermore, a spring lock part 57 is formed on a part of the driven gear 21, a spring lock part 58 that is opposed to the spring lock part 57 is formed on a part of the holding part opening/closing member 45, and an axis-tilting plate coil spring 59 whose both ends are locked between the spring lock parts 57, 58 is arranged. Tensile force is made to act on the axis-tilting plate coil spring 59 in a direction in which the spring lock part 58 is made to come close to the spring lock part 57.

As illustrated in FIG. 14, the holding part 49 is configured by four fan-shaped members 60 to 63 obtained by dividing a circular member in quarters, and the fan-shaped members 60 to 63 are fixed on the upper ends of the four rotation-transmitting shafts 47. On the fan-shaped members 61, 63 that are opposed to each other in the radial direction, circular arc-shaped outer ring-holding surfaces 61a, 63a that protrude inwardly in the radial direction are formed.

Next, a procedure for assembling the bearing unit BU into the hub main body 1 using the assembling device of a wheel hub unit of the second embodiment according to the present invention will be described.

First, the cylinder rod 55a of the cylinder 55 is stroked to be engaged with the cylinder engagement part 56 of the holding part opening/closing member 45, so that the axis-tilting plate 44 is rotated in the arrow direction of FIG. 12.

By this operation, each of the four rotation-transmitting shafts 47 in which the spherical parts 46 are turnably connected to the spherical receiving seats 41 is in contact with the inner wall 54 whose inclination is gradually increased outwardly in the radial direction from the inner wall 53 at the one end of the tilt guide slit 51 in the longitudinal direction, and becomes a state of being inclined outwardly in the radial direction, so that the four fan-shaped members 60 to 63 configuring the holding part 49 become a state of being opened outwardly in the radial direction.

After that, the fixation screws 17 that protrude downward from the flange 1c of the hub main body 1 are inserted into the concave parts 10a for screws of the hub main body-placing unit 10 and the external cylindrical part 1e of the hub main body 1 is inserted into the concave part 10b for an external cylindrical part of the hub main body-placing unit 10, so that the hub main body 1 is placed on the hub main body-placing unit 10 such that the hollow cylindrical part 1a faces upward.

After that, the cylinder rod 55a of the cylinder 55 is retracted, so that the engagement with the cylinder engagement part 56 of the holding part opening/closing member 45 is released. Accordingly, tensile force is made to act on the axis-tilting plate coil spring 59, so that the axis-tilting plate 44 is rotated in the arrow direction of FIG. 10. When the axis-tilting plate 44 is rotated in the direction illustrated in FIG. 10, each of the four rotation-transmitting shafts 47 that are inclined outwardly in the radial direction is in contact with the inner wall 53 at the one end, which extends in the vertical direction, from the inner wall 54 at the other end of the tilt guide slit 51 in the longitudinal direction, and becomes a state of rising in the vertical direction, so that the four fan-shaped members 60 to 63 are connected to be the circular member, and the outer ring-holding surfaces 61a, 63a of the fan-shaped members 61, 63 hold the bearing unit BU in a state of being in surface contact with the concave parts 5c1, 5c2 of the outer ring 5 (refer to FIG. 9).

After that, when the inner-ring press-fitting unit 14 is lowered toward the hollow cylindrical part 1a by the lowering operation of the lifting/lowering means 35, the bearing unit BU is pressed downward by the inner-ring press-fitting unit 14, and the holding part 49 that holds the bearing unit BU is lowered along the four rotation-transmitting shafts 47 while the supporting coil springs 48 are gradually compressed.

Then, the rotary motor 33 of the rotational drive source 13 is driven at the same time as the inner ring 2 of the bearing unit BU comes into contact with the uppermost part of the hollow cylindrical part 1a of the hub main body 1.

Then, when the inner ring 2 comes into contact with the uppermost part of the hollow cylindrical part 1a of the hub main body 1 and the rotary motor 33 is driven, the rotation of the driving gear 34 is transmitted to the driven gear 21 of the bearing setting unit 40 through the intermediate gear 32, and the rotation of the driven gear 21 is transmitted to the holding part 49 through the four rotation-transmitting shafts 47. Then, the bearing unit BU held by the holding part 49 also rotates.

It is to be noted that a means for detecting that the inner ring 2 of the bearing unit BU comes into contact with the uppermost part of the hollow cylindrical part 1a of the hub main body 1 is based on the preset amount of the holding part 49 (the four fan-shaped members 60 to 63) of the bearing setting unit 40 lowered.

Although the outer ring 5 of the bearing unit BU rotates by the rotating holding part 49, the inner ring 2 does not rotate because of being in contact with and pressed against the upper end surface of the hollow cylindrical part 1a at rest. In addition, similarly, the inner ring 3 connected to the inner ring 2 by the connecting member 15 also does not rotate. In this manner, the outer ring 5 is relatively rotated in a state where the inner rings 2, 3 do not rotate, so that the tapered rollers 6a, 6b roll and aligning action is implemented on the tapered rollers 6a, 6b, and thus, the tapered rollers 6a, 6b are arranged at the true position as illustrated in FIG. 20B. The lifting/lowering means 35 is lowered in this state, so that the inner-ring press-fitting unit 14 pushes the bearing unit BU and the bearing setting unit 12 downward through the inner rings 2, 3.

The holding part 49 of the bearing setting unit 40 is lowered along the four rotation-transmitting shafts 47 while the supporting coil springs 48 are gradually compressed. In this process, the connecting member 15 that is internally fit to the two inner rings 2, 3 of the bearing unit BU is pressed by the upper end of the hollow cylindrical part 1a to be entered into the housing concave part 36 of the inner-ring press-fitting unit 14, and the inner rings 2, 3 are press-fit to the hollow cylindrical part 1a. Then, when the lower end of the inner ring 2 is in contact with the base of the hollow cylindrical part 1a, the assembly of the bearing unit BU into the hub main body 1 is completed.

In order to remove the wheel hub unit whose assembly has been completed from the assembling device of a wheel hub unit, first, the holding part 49 of the bearing setting unit 40 is rotated such that the cylinder engagement part 56 is located below the cylinder 55.

After that, the inner-ring press-fitting unit 14 is moved upward by the lifting operation of the lifting/lowering means 35. When the inner-ring press-fitting unit 14 is lifted, the holding part 49 that holds the wheel hub unit is also lifted along the four rotation-transmitting shafts 47 while the supporting coil springs 48 are gradually elongated.

After that, when the holding part 49 stops at a position of the uppermost part of the four rotation-transmitting shafts 47, the cylinder rod 55a of the cylinder 55 is stroked to be engaged with the cylinder engagement part 56 of the holding part opening/closing member 45, so that the axis-tilting plate 44 is rotated in the arrow direction of FIG. 12.

Then, when the holding part 49 stops at the position of the uppermost part of the four rotation-transmitting shafts 47, the wheel hub unit is grasped by a carrier device (not illustrated). At the same time, the fan-shaped members 60 to 63 are opened outwardly in the radial direction. In addition, in the case where a carrier device is not used, a worker grasps the wheel hub unit with a hand in a state where the fan-shaped members 60 to 63 are opened outwardly in the radial direction.

Next, the operation and effect when the wheel hub unit is assembled using the above-described assembling device of a wheel hub unit of the third embodiment will be described.

According to the present embodiment, the bearing unit BU is set in the holding part 49 of the bearing setting unit 40, so that the bearing unit BU is arranged coaxially with the hollow cylindrical part 1a of the hub main body 1 placed on the hub main body-placing unit 10. Then, the inner-ring press-fitting unit 14 lowers the bearing unit BU and the bearing setting unit 40 toward the hollow cylindrical part 1a of the hub main body 1 by the lowering operation of the lifting/lowering means 35. Accordingly, the holding part 49 is moved toward the hollow cylindrical part 1a along the four rotation-transmitting shafts 47 while the supporting coil springs 48 are gradually compressed.

When the inner ring 2 of the bearing unit BU comes into contact with the uppermost part of the hollow cylindrical part 1a of the hub main body 1, the rotary motor 33 of the rotational drive source 13 is driven. The rotational force of the rotational drive source 13 is transmitted to the driven gear 21 of the bearing setting unit 40, and is transmitted to the holding part 49 and the outer ring 5 through the four rotation-transmitting shafts 47. The inner rings 2, 3 of the bearing unit BU cannot rotate because of being pressed against the hollow cylindrical part 1a at rest, and therefore, the outer ring 5 is relatively rotated to the inner rings 2, 3, the tapered rollers 6a, 6b roll and the aligning action is implemented, the tapered rollers 6a, 6b are arranged at the true position as illustrated in FIG. 20B, and the bearing unit BU is incorporated in the hollow cylindrical part 1a.

Therefore, the bearing setting unit 40 has a function of arranging the bearing unit BU coaxially with the hollow cylindrical part 1a of the hub main body 1 and moving the bearing unit BU toward the hollow cylindrical part 1a, the rotational drive source 13 has a function of transmitting the rotational force to the bearing unit BU held by the bearing setting unit 40, and the inner-ring press-fitting unit 14 has a function of externally fitting the inner rings 2, 3 to the hollow cylindrical part 1a by driving of the lifting/lowering means 35, so that the assembling device of a wheel hub unit of the present embodiment includes a specific device configuration that makes the inner rings 2, 3 be externally fit to the hollow cylindrical part 1a while transmitting the rotational force to the outer ring 5. The bearing unit BU can be assembled into the hollow cylindrical part 1a of the hub main body 1 in short working time and in small working man-hours by using these devices, and thus, the wheel hub unit can be efficiently assembled.

In addition, the holding part 49 configuring the bearing setting unit 40 is configured by the four fan-shaped members 60 to 63 supported by the four rotation-transmitting shafts 47 that are tiltable outwardly in the radial direction, when the axis-tilting plate 44 (the holding part opening/closing member 45) is rotated by the operation of the cylinder 55, the four rotation-transmitting shafts 47 are inclined outwardly in the radial direction, and the fan-shaped members 60 to 63 are moved outwardly in the radial direction to have a split shape, and, when the axis-tilting plate 44 is rotated to the original position by release of the operation of the cylinder 55 and the tensile force of the axis-tilting plate coil spring 59, the four rotation-transmitting shafts 47 are returned to the original position (in the vertical direction), the four fan-shaped members 60 to 63 are connected to be the circular member, and the outer ring-holding surfaces 61a, 63a of the fan-shaped members 61, 63 hold the bearing unit BU in a state of being in surface contact with the concave parts 5c1, 5c2 of the outer ring 5. Therefore, the assembling device of a wheel hub unit of the present embodiment can easily perform an operation of holding the bearing unit BU in the holding part 49 and an operation of removing the bearing unit BU from the holding part 49 and grasping the bearing unit BU.

[Fourth Embodiment]

Figure 17:
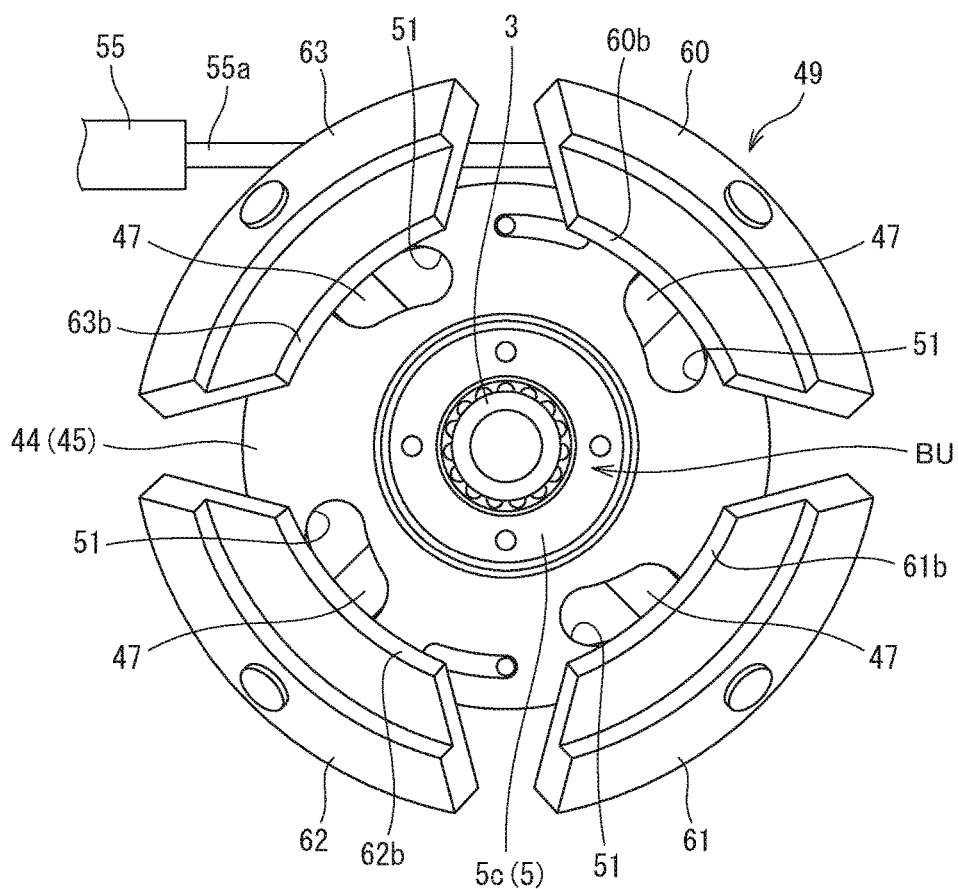
FIG. 17 is a view illustrating a state where the four fan-shaped members configuring the holding part of a fourth embodiment according to the present invention are moved outwardly in the radial direction.
Figure 18:
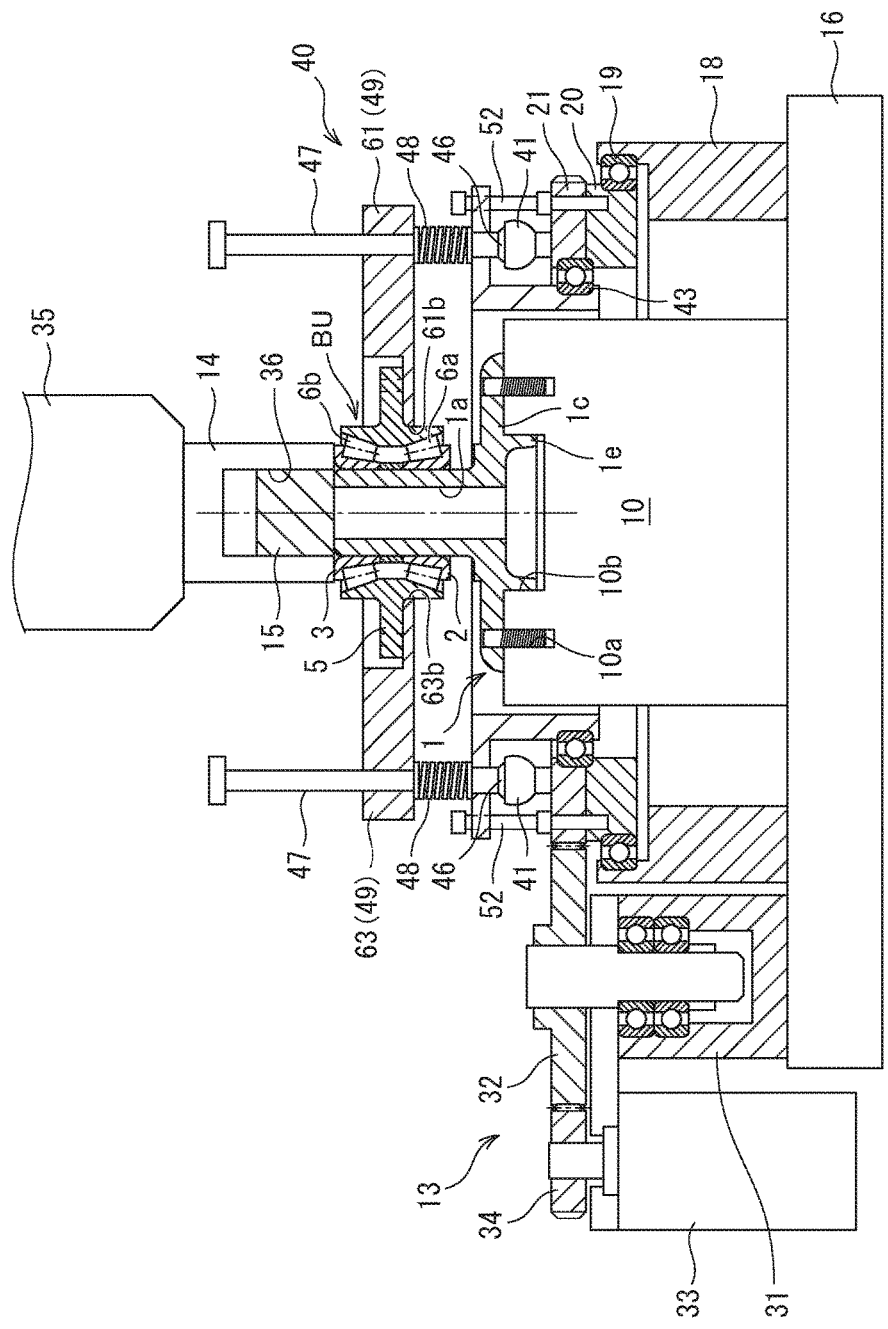
FIG. 18 is a view illustrating a state where the inner rings are externally fit to the cylindrical part of the hub main body by rotating the outer ring while stopping the rotation of the inner rings, in a device of the fourth embodiment according to the present invention.

Next, FIG. 17 and FIG. 18 illustrate an assembling device of a wheel hub unit of a fourth embodiment according to the present invention.

The supporting/fixing part 5c of the outer ring 5 configuring the bearing unit BU of the present embodiment is formed to have a circular shape as illustrated in FIG. 17.

In addition, as illustrated in FIG. 17, in the holding part 49 configuring the bearing setting unit 40 of the present embodiment, circular arc-shaped outer ring-holding surfaces 60b to 63b are formed on the inner peripheral surfaces of the four fan-shaped members 60 to 63 obtained by dividing the circular member in quarters.

In the closing operation of the holding part 49 in which the four fan-shaped members 60 to 63 become the circular member, on the inner peripheral surfaces of the fan-shaped members 60 to 63, the circular arc-shaped outer ring-holding surfaces 60b to 63b hold the bearing unit BU in a state of being in surface contact with the outer peripheral surface (the outer peripheral surface at a position where the outer ring raceway 5b is formed) of the outer ring 5.

The unique operation and effect of the present embodiment will be described.

The holding part 49 configuring the bearing setting unit 40 is configured by the four fan-shaped members 60 to 63 supported by the four rotation-transmitting shafts 47 that are tiltable outwardly in the radial direction, when the axis-tilting plate 44 (the holding part opening/closing member 45) is rotated by the operation of the cylinder 55, the four rotation-transmitting shafts 47 are inclined outwardly in the radial direction, and the fan-shaped members 60 to 63 are moved outwardly in the radial direction to have a split shape, and, when the axis-tilting plate 44 is rotated to the original position by release of the operation of the cylinder 55 and the tensile force of the axis-tilting plate coil spring 59, the four rotation-transmitting shafts 47 are returned to the original position (in the vertical direction), the four fan-shaped members 60 to 63 are connected to be the circular member, and the outer ring-holding surfaces 60b to 63b of the fan-shaped members 60 to 63 hold the bearing unit BU in a state of being in surface contact with the outer peripheral surface of the outer ring 5. Therefore, the assembling device of a wheel hub unit of the present embodiment can easily perform an operation of holding the bearing unit BU in the holding part 49 and an operation of removing the bearing unit BU from the holding part 49 and grasping the bearing unit BU.

It is to be noted that, in the wheel hub unit illustrated in FIG. 19, the tapered roller bearing unit BU in which the two inner rings 2, 3 are arranged on the inside of the outer ring 5 has been described, but the same effect can be exhibited even when using a tapered roller bearing unit having another structure, in which three inner rings are arranged on the inside of the outer ring 5.

Figure 21:
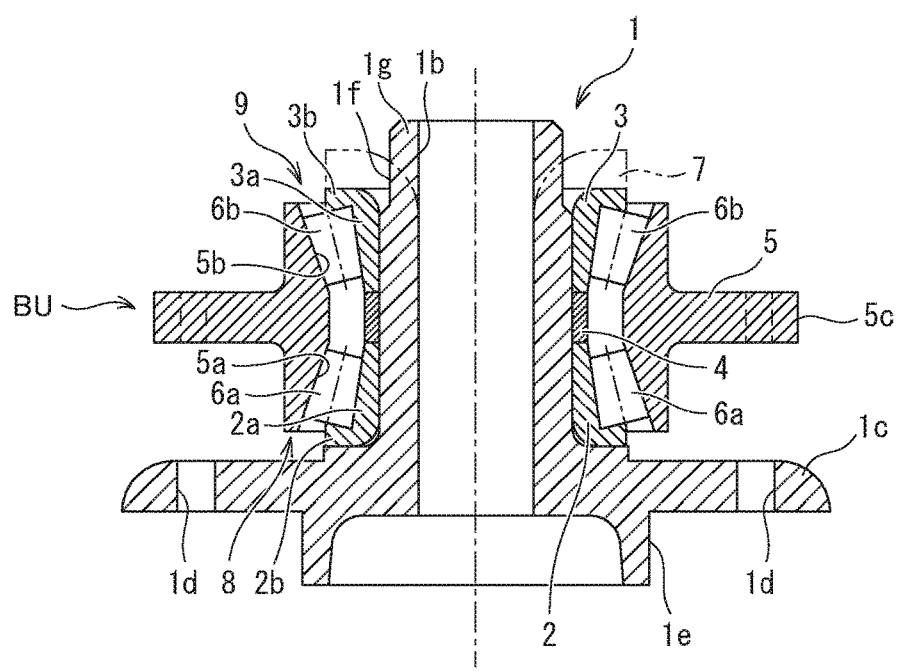
FIG. 21 is a view illustrating a wheel hub unit having a different structure from FIG. 19, in which a stepped part is provided on a hollow cylindrical part.

In addition, the hub main body 1 of FIG. 19 includes the hollow cylindrical part 1a having a straight shape (a shape having the same outer diameter from the upper end to the lower end), but a hollow cylindrical part 1g having a stepped part 1f on the upper end side, as illustrated in FIG. 21, may be used. It is to be noted that, in the case of providing the stepped part 1f, when the bearing unit BU is lowered, the inner ring 2 is loosely fit to the stepped part 1f, thereby being located at a preferable position in a preferable posture for press-fitting. Consequently, there is an effect making it difficult to occur so-called "galling" in which the inner ring 2 is obliquely press-fit to the hollow cylindrical part 1g, and thus the inner ring 2 and the hollow cylindrical part 1g are damaged. In the case of using the hub main body 1 of FIG. 21, the timing to drive the rotary motor 33 of the rotational drive source 13 in each of the above-described embodiments is set when the inner-ring press-fitting unit 14 is lowered toward the hollow cylindrical part 1a by the lowering operation of the lifting/lowering means 35 and the inner ring 2 of the bearing unit BU is in contact with the stepped part 1f of the hub main body 1.

It is to be noted that, a hub cylindrical part according to the present invention corresponds to the hollow cylindrical part 1a, a driven member according to the present invention corresponds to the driven gear 21, divided holding members according to the present invention correspond to the semicircular members 27, 28, a concave part according to the present invention corresponds to the housing concave part 36, an axis-swinging member according to the present invention corresponds to the axis-tilting plate 44, coil springs according to the present invention correspond to the supporting coil springs 48, divided holding members according to the present invention correspond to the fan-shaped members 60 to 63, and a bearing unit according to the present invention corresponds to the tapered roller bearing unit BU.

INDUSTRIAL APPLICABILITY

As described above, the assembling device of a wheel hub unit according to the present invention is useful for efficiently assembling a wheel hub unit.

REFERENCE SIGNS LIST 1 hub main body
1a hollow cylindrical part
1c flange
2, 3 inner ring
2a inner ring raceway
2b stepped part
3a inner ring raceway
3b stepped part
4 distance piece
5 outer ring
5a outer ring raceway
5b outer ring raceway
5c supporting/fixing part
6a, 6b tapered roller
8 first-row tapered roller bearing
9 second-row tapered roller bearing
10 hub main body-placing unit
10a concave part for screw
10b concave part for external cylindrical part
12 bearing setting unit
13 rotational drive source
14 inner-ring press-fitting unit
15 connecting member
16 device base stand
18 bearing stand
19 ball bearing
20 gear receiving member
21 driven gear
22 first rotation-transmitting shaft
23 second rotation-transmitting shaft
24, 25 supporting coil spring
26 holding part
27, 28 semicircular member
27a, 28a hinge part
27b, 28b lever engagement part
27c, 28c spring lock part
27d, 28d outer ring-holding surface
27e, 28e rotation-transmitting shaft engagement surface
27f, 28f outer ring-holding surface
29 outer ring-holding coil spring
30 opening/closing device
30a, 30b opening operation lever
31 gear supporting part
32 intermediate gear
33 rotary motor
34 driving gear
35 lifting/lowering means
36 housing concave part
40 bearing setting unit
41 spherical receiving seat
42 cylindrical part
43 ball bearing
44 axis-tilting plate
45 holding part opening/closing member
46 spherical part
47 rotation-transmitting shaft
48 supporting coil spring
49 holding part
50 rotation guide slit
51 tilt guide slit
52 guide pin
53 inner wall atone end of tilt guide slit in longitudinal direction
54 inner wall toward the other end of tilt guide slit in longitudinal direction
55 cylinder
55a cylinder rod
56 cylinder engagement part
57 spring lock part
57, 58 spring lock part
58 spring lock part
59 axis-tilting plate coil spring
60 to 63 fan-shaped member
60b to 63b outer ring-holding surface
61a, 63b outer ring-holding surface
60a to 63a outer ring-holding surface BU tapered roller bearing unit The invention is:

1. An assembling device of a wheel hub unit, comprising:
a bearing setting unit configured to set a bearing unit including an inner ring, an outer ring, a plurality of tapered rollers rollably arranged between an inner ring raceway formed on an outer peripheral surface of the inner ring and an outer ring raceway formed on an inner peripheral surface of the outer ring, and a stepped part which is formed on an outer end part of the inner ring in an axial direction and with which end surfaces of the tapered rollers in the axial direction are in contact, such that the bearing unit is coaxial with respect to a hub cylindrical part provided at an end part of a hub main body in the axial direction and can be moved toward the hub cylindrical part;
a rotational drive source configured to transmit rotational force around an axis to the bearing unit set in the bearing setting unit; and
an inner-ring press-fitting unit configured to externally fit the inner ring of the bearing unit to which the rotational force around the axis has been transmitted, to the hub cylindrical part; wherein
the bearing setting unit includes:
a circular holding part configured to hold the outer ring of the bearing unit from an outer periphery;

a circular driven member which is arranged coaxially around the hub main body and to which the rotational force is transmitted from the rotational drive source; and a rotational force-transmitting part which is connected between the driven member and the holding part and configured to transmit the rotational force, transmitted to the driven member, to the holding part; and the holding part includes a plurality of divided holding members being spaced apart from one another in an opening state and holding the outer ring of the bearing unit from the outer periphery in a closed state.

2. The assembling device of a wheel hub unit according to claim 1, wherein the rotational force-transmitting part includes a plurality of rotation-transmitting shafts fixed on the driven member and extending toward the holding part, the holding part includes divided holding members divided into two parts, which are configured to open/close with hinge parts as a turn center and to hold the outer ring of the bearing unit, and the hinge parts are connected to one of the plurality of rotation-transmitting shafts such that the two divided holding members turn in a direction perpendicular to the rotation-transmitting shaft, so that the two divided holding members perform an opening/closing operation with the hinge parts as the turn center.

3. The assembling device of a wheel hub unit according to claim 2, wherein coil springs which support the holding part such that the holding part can be moved toward the hub cylindrical part are arranged on outer peripheries of the plurality of rotation-transmitting shafts.

* * * * *